US011263834B1

(12) United States Patent
Webster

(10) Patent No.: US 11,263,834 B1
(45) Date of Patent: Mar. 1, 2022

(54) AUTOMOBILE RISK ASSESSMENT USING AVERAGE VELOCITY DIFFERENTIALS

(71) Applicant: STATE FARM MUTUAL AUTOMOBILE INSURANCE COMPANY, Bloomington, IL (US)

(72) Inventor: Eric Webster, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 661 days.

(21) Appl. No.: 15/890,876

(22) Filed: Feb. 7, 2018

Related U.S. Application Data

(60) Provisional application No. 62/504,180, filed on May 10, 2017.

(51) Int. Cl.
*G06Q 40/08* (2012.01)
*G07C 5/08* (2006.01)
*B60W 40/105* (2012.01)
*H04W 4/44* (2018.01)
*B60W 40/09* (2012.01)
(Continued)

(52) U.S. Cl.
CPC ............... *G07C 5/08* (2013.01); *B60W 40/09* (2013.01); *B60W 40/105* (2013.01); *G06Q 40/08* (2013.01); *G07C 5/008* (2013.01); *H04W 4/029* (2018.02); *H04W 4/44* (2018.02)

(58) Field of Classification Search
CPC .......... G06Q 40/00; G06Q 40/08; G07C 5/08; G07C 5/008; H04W 4/44; H04W 4/029; B60W 40/105; B60W 40/09
See application file for complete search history.

(56) References Cited

U.S. PATENT DOCUMENTS 9,595,191 B1 3/2017 Surpi
9,805,601 B1 10/2017 Fields et al.
(Continued)

FOREIGN PATENT DOCUMENTS

KR 10-2013-0084013 A 7/2013
KR 101538354 B1 * 7/2015

OTHER PUBLICATIONS

Thomas A. Becker, Ikhlaq Sidhu, and Burghardt Tenderich, Aug. 24, 2009, University of California, Berkeley, web, 1-20 (Year: 2009).*

*Primary Examiner* — I Jung Liu
(74) *Attorney, Agent, or Firm* — Faegre Drinker Biddle & Reath

(57) ABSTRACT

Systems and methods for using a vehicle's relative speed to determine an automobile insurance risk assessment rating are provided. According to certain aspects, an average velocity may be calculated, either from real-time or historical telematics data, for a group of vehicles traveling in the same direction on a roadway. Additionally, an average velocity differential for a target vehicle may be determined based upon the average velocity of the group of vehicles. Moreover, based upon the average velocity differential, an automobile insurance risk assessment rating for an individual may be determined which may cause a change in the individual's automobile insurance premium. Further, recommendations on how to improve the individual's automobile insurance risk assessment rating may be provided to the user via the user interface of an electronic device associated with the individual.

20 Claims, 13 Drawing Sheets

(51) Int. Cl.
*H04W 4/029* (2018.01)
*G07C 5/00* (2006.01)

(56) References Cited

U.S. PATENT DOCUMENTS

| | | |
|---|---|---|
| 2004/0153362 A1 | 8/2004 | Bauer et al. |
| 2008/0033684 A1* | 2/2008 | Vian ................... G05D 1/0027 |
| | | 701/1 |
| 2011/0090075 A1 | 4/2011 | Armitage et al. |
| 2015/0170287 A1* | 6/2015 | Tirone ................... G06Q 40/08 |
| | | 705/4 |
| 2015/0375756 A1 | 12/2015 | Do et al. |
| 2016/0297436 A1 | 10/2016 | Shin et al. |
| 2017/0021764 A1* | 1/2017 | Adams ................... G06Q 40/08 |
| 2017/0132855 A1 | 5/2017 | Kim et al. |
| 2018/0218598 A1* | 8/2018 | Aoki ....................... B60Q 9/00 |

* cited by examiner

500

REAL-TIME TELEMATICS DATA
(FILTERED BY GEOFENCE)
DIRECTION = EAST
THRESHOLD DISTANCE = 0.25 MILES

| ELECTRONIC DEVICE ID | DATE | TIME | DISTANCE FROM TARGET VEHICLE (miles) | VELOCITY (mph) | DIRECTION |
|---|---|---|---|---|---|
| TARGET | 3/22/2017 | 5:02 PM | - | 25 | East |
| 51134 | 3/22/2017 | 5:02 PM | 0.07 | 29 | East |
| 51118 | 3/22/2017 | 5:02 PM | 0.08 | 52 | Northeast |
| 51121 | 3/22/2017 | 5:02 PM | 0.10 | 37 | East |
| 51133 | 3/22/2017 | 5:02 PM | 0.23 | 59 | Northeast |
| 51132 | 3/22/2017 | 5:02 PM | 0.12 | 60 | West |
| 51114 | 3/22/2017 | 5:02 PM | 0.13 | 35 | East |
| 51131 | 3/22/2017 | 5:02 PM | 0.22 | 40 | East |
| 51116 | 3/22/2017 | 5:02 PM | 0.24 | 49 | Southwest |
| 51120 | 3/22/2017 | 5:02 PM | 0.18 | 31 | East |
| 51135 | 3/22/2017 | 5:02 PM | 0.17 | 40 | Northeast |
| 51127 | 3/22/2017 | 5:02 PM | 0.05 | 55 | West |
| 51119 | 3/22/2017 | 5:02 PM | 0.24 | 57 | Southwest |
| 51123 | 3/22/2017 | 5:02 PM | 0.15 | 34 | East |
| 51129 | 3/22/2017 | 5:02 PM | 0.14 | 62 | Southwest |
| 51115 | 3/22/2017 | 5:02 PM | 0.18 | 52 | West |
| 51112 | 3/22/2017 | 5:02 PM | 0.21 | 42 | East |
| 51128 | 3/22/2017 | 5:02 PM | 0.15 | 54 | Southwest |
| 51117 | 3/22/2017 | 5:02 PM | 0.05 | 33 | East |
| 51122 | 3/22/2017 | 5:02 PM | 0.25 | 48 | Northeast |
| 51111 | 3/22/2017 | 5:02 PM | 0.20 | 32 | East |

REAL-TIME TELEMATICS DATA
(FILTERED BY GEOFENCE AND DIRECTION)
DIRECTION = EAST
THRESHOLD DISTANCE = 0.25 MILES

| ELECTRONIC DEVICE ID | DATE | TIME | DISTANCE FROM TARGET VEHICLE (miles) | VELOCITY (mph) | DIRECTION |
|---|---|---|---|---|---|
| TARGET | 3/22/2017 | 5:02 PM | - | 25 | East |
| 51134 | 3/22/2017 | 5:02 PM | 0.07 | 29 | East |
| 51121 | 3/22/2017 | 5:02 PM | 0.10 | 37 | East |
| 51114 | 3/22/2017 | 5:02 PM | 0.13 | 35 | East |
| 51131 | 3/22/2017 | 5:02 PM | 0.22 | 40 | East |
| 51120 | 3/22/2017 | 5:02 PM | 0.18 | 31 | East |
| 51123 | 3/22/2017 | 5:02 PM | 0.15 | 34 | East |
| 51112 | 3/22/2017 | 5:02 PM | 0.21 | 42 | East |
| 51117 | 3/22/2017 | 5:02 PM | 0.05 | 33 | East |
| 51111 | 3/22/2017 | 5:02 PM | 0.20 | 32 | East |

| | |
|---|---|
| Average Velocity (mph) | 34.78 |
| Average Velocity Differential (mph) | -9.78 |

FIG. 5B

600
HISTORICAL TELEMATICS DATA
(FILTERED BY DAY OF WEEK, TIME, AND GEOFENCE)
DIRECTION = NORTH
THRESHOLD DISTANCE = 0.25 MILES
THRESHOLD TIME PERIOD = 5 MINUTES
WEATHER CONDITIONS = RAIN

| ELECTRONIC DEVICE ID | DATE | TIME | DISTANCE FROM TARGET VEHICLE (miles) | VELOCITY (mph) | DIRECTION | WEATHER CONDITIONS |
|---|---|---|---|---|---|---|
| TARGET | 3/23/2017 | 7:54 AM | - | 55 | North | Rain |
| 52093 | 2/16/2017 | 7:50 AM | 0.19 | 64 | North | Normal |
| 52111 | 2/16/2017 | 7:55 AM | 0.24 | 41 | South | Normal |
| 52106 | 3/16/2017 | 7:59 AM | 0.11 | 56 | East | Snow |
| 52094 | 2/9/2017 | 7:51 AM | 0.23 | 59 | South | Rain |
| 52108 | 2/23/2017 | 7:59 AM | 0.02 | 54 | South | Normal |
| 52090 | 3/9/2017 | 7:55 AM | 0.15 | 37 | East | Rain |
| 52103 | 2/9/2017 | 7:51 AM | 0.05 | 43 | North | Rain |
| 52100 | 2/2/2017 | 7:50 AM | 0.24 | 48 | East | Snow |
| 52102 | 3/16/2017 | 7:49 AM | 0.12 | 61 | South | Snow |
| 52098 | 3/16/2017 | 7:53 AM | 0.17 | 65 | West | Snow |
| 52097 | 3/2/2017 | 7:50 AM | 0.12 | 31 | South | Rain |
| 52089 | 2/9/2017 | 7:58 AM | 0.09 | 58 | West | Rain |
| 52105 | 3/9/2017 | 7:55 AM | 0.16 | 47 | North | Rain |
| 52107 | 3/23/2017 | 7:49 AM | 0.18 | 52 | East | Rain |
| 52110 | 3/9/2017 | 7:52 AM | 0.22 | 32 | North | Rain |
| 52099 | 3/2/2017 | 7:56 AM | 0.03 | 68 | South | Rain |
| 52104 | 2/16/2017 | 7:58 AM | 0.09 | 36 | West | Normal |
| 52109 | 2/2/2017 | 7:53 AM | 0.13 | 51 | South | Snow |
| 52088 | 3/2/2017 | 7:57 AM | 0.02 | 45 | North | Rain |
| 52096 | 2/2/2017 | 7:49 AM | 0.04 | 42 | North | Snow |
| 52092 | 2/23/2017 | 7:52 AM | 0.17 | 39 | North | Normal |
| 52091 | 2/9/2017 | 7:51 AM | 0.15 | 45 | North | Rain |
| 52095 | 2/16/2017 | 7:56 AM | 0.05 | 35 | West | Normal |
| 52101 | 2/23/2017 | 7:57 AM | 0.04 | 50 | South | Normal |

HISTORICAL TELEMATICS DATA
(FILTERED BY DAY OF WEEK, TIME, GEOFENCE, AND DIRECTION)
DIRECTION = NORTH
THRESHOLD DISTANCE = 0.25 MILES
THRESHOLD TIME PERIOD = 5 MINUTES
WEATHER CONDITIONS = RAIN

| ELECTRONIC DEVICE ID | DATE | TIME | DISTANCE FROM TARGET VEHICLE (miles) | VELOCITY (mph) | DIRECTION | WEATHER CONDITIONS |
|---|---|---|---|---|---|---|
| TARGET | 3/23/2017 | 7:54 AM | - | 55 | North | Rain |
| 52093 | 2/16/2017 | 7:50 AM | 0.19 | 64 | North | Normal |
| 52103 | 2/9/2017 | 7:51 AM | 0.05 | 43 | North | Rain |
| 52105 | 3/9/2017 | 7:55 AM | 0.16 | 47 | North | Rain |
| 52110 | 3/9/2017 | 7:52 AM | 0.22 | 32 | North | Rain |
| 52088 | 3/2/2017 | 7:57 AM | 0.02 | 45 | North | Rain |
| 52096 | 2/2/2017 | 7:49 AM | 0.04 | 42 | North | Snow |
| 52092 | 2/23/2017 | 7:52 AM | 0.17 | 39 | North | Normal |
| 52091 | 2/9/2017 | 7:51 AM | 0.15 | 45 | North | Rain |

HISTORICAL TELEMATICS DATA
(FILTERED BY DAY OF WEEK, TIME, GEOFENCE, DIRECTION, AND WEATHER)
DIRECTION = NORTH
THRESHOLD DISTANCE = 0.25 MILES
THRESHOLD TIME PERIOD = 5 MINUTES
WEATHER CONDITIONS = RAIN

| ELECTRONIC DEVICE ID | DATE | TIME | DISTANCE FROM TARGET VEHICLE (miles) | VELOCITY (mph) | DIRECTION | WEATHER CONDITIONS |
|---|---|---|---|---|---|---|
| TARGET | 3/23/2017 | 7:54 AM | - | 55 | North | Rain |
| 52103 | 2/9/2017 | 7:51 AM | 0.05 | 43 | North | Rain |
| 52105 | 3/9/2017 | 7:55 AM | 0.16 | 47 | North | Rain |
| 52110 | 3/9/2017 | 7:52 AM | 0.22 | 32 | North | Rain |
| 52088 | 3/2/2017 | 7:57 AM | 0.02 | 45 | North | Rain |
| 52091 | 2/9/2017 | 7:51 AM | 0.15 | 45 | North | Rain |
| | Average Velocity (mph) | | | 42.4 | | |
| | Average Velocity Differential (mph) | | | 12.6 | | |

FIG. 6C

AUTOMOBILE RISK ASSESSMENT USING AVERAGE VELOCITY DIFFERENTIALS

CROSS REFERENCE TO RELATED APPLICATIONS

This application claims the benefit of U.S. Provisional Patent Application No. 62/504,180, entitled "Automatic Insurance Risk Assessment Using Relative Speed," filed May 10, 2017, the disclosure of which is hereby expressly incorporated by reference herein in its entirety.

TECHNICAL FIELD

The present disclosure relates to using a vehicle's ambient speed to determine an automobile insurance risk assessment rating for an individual. More particularly, the present disclosure relates to determining an average velocity differential between a vehicle and a group of surrounding vehicles based upon real-time or historical data to determine a risk assessment rating.

BACKGROUND

Generally, vehicles may travel at different velocities on the same section of a roadway. Although there may be a posted speed limit to which vehicle operators should adhere, other road conditions (e.g., road construction, weather, traffic, etc.) as well as the velocity of other vehicles on the same roadway in the vicinity of the vehicle may cause vehicle operators to regularly deviate from the posted speed limit. Therefore, current systems that assess the risk of a particular vehicle operator by comparing the velocity of the vehicle to the posted speed limit may have several drawbacks.

BRIEF SUMMARY

In contrast to conventional systems, the embodiments of the present disclosure are related to assessing vehicle operator risk by comparing the velocity of the vehicle to other proximate vehicles, taking other factors into account such as the current weather and road conditions. To do so, the present disclosure generally relates to measuring a particular vehicle's velocity with reference to other vehicles to determine the vehicle's relative speed. A vehicle's relative speed may be calculated, for example, by collecting velocity data (e.g., in the form of collected telematics data) that is associated with other nearby vehicles, and determining a vehicle's speed relative to these nearby vehicles driving at similar times, locations, and/or directions. Once calculated, a vehicle's relative speed is used to assess the risk of that particular vehicle's operator. Embodiments of example systems and methods are summarized below. The techniques summarized below may include additional, less, or alternate actions, including those discussed elsewhere herein.

In one aspect, a computer-implemented method for an automobile insurance risk assessment rating may be provided. The method may include one or more processors (1) receiving a first set of telematics data associated with a vehicle operated by an individual and indicating a velocity of the vehicle; (2) accessing a second set of telematics data associated with each of a plurality of other vehicles within a threshold distance of the vehicle, the second set of telematics data indicating a velocity of each of the plurality of other vehicles within a time period associated with when the first set of telematics data was generated; (3) averaging the velocity of each of the plurality of other vehicles to determine an average velocity; (4) calculating average velocity differential based upon a difference between the average velocity and the velocity of the vehicle; and/or (5) determining a rating based upon the average velocity differential. The method may include additional, less, or alternate actions, including those discussed elsewhere herein.

In another aspect, a remote server for an automobile insurance risk assessment rating may be provided. The remote server may include (1) a communication unit configured to receive a first set of telematics data associated with a vehicle operated by an individual and indicating a velocity of the vehicle; and (2) a processor unit configured to: (a) access a second set of telematics data associated with each of a plurality of other vehicles within a threshold distance of a location of the vehicle, the second set of telematics data indicating a velocity of each of the plurality of other vehicles within a time period associated with when the first set of telematics data was generated; (b) average the velocity of each of the plurality of other vehicles to determine an average velocity; (c) calculate an average velocity differential based upon a difference between the average velocity and the velocity of the vehicle; and/or (d) determine a rating based upon the average velocity differential. The remote server may include additional, less, or alternate functionality, including that discussed elsewhere herein.

In yet another aspect, a tangible, non-transitory computer-readable medium for an automobile insurance risk assessment rating may be provided. The tangible, non-transitory computer-readable medium may include instructions executable by one or more processors that, when executed by the one or more processors, cause the one or more processors to (1) receive a first set of telematics data associated with a vehicle operated by an individual and indicating a velocity of the vehicle; (2) access a second set of telematics data associated with each of a plurality of other vehicles within a threshold distance of a location of the vehicle, the second set of telematics data indicating a velocity of each of the plurality of other vehicles within a time period associated with when the first set of telematics data was generated; (3) average the velocity of each of the plurality of other vehicles to determine an average velocity; (4) calculate an average velocity differential based upon a difference between the average velocity and the velocity of the vehicle; and/or (5) determine a rating based upon the average velocity differential. The instructions may include or direct additional, less, or alternate functionality, including that discussed elsewhere herein.

Systems or computer-readable media storing executable instructions for implementing all or part of the systems and/or methods described herein may also be provided in some embodiments. Systems for implementing such methods may include one or more of the following: a special-purpose computing device, a mobile computing device, a personal electronic device, an on-board computer, one or more remote servers or a cloud computing system, one or more remote data storage entities, one or more sensors, one or more communication modules configured to communicate wirelessly via radio links, radio frequency links, wireless or digital communication channels, and/or one or more non-transitory, tangible program memories coupled to one or more processors of the special-purpose computing device, mobile computing device, personal electronic device, on-board computer, and/or one or more remote servers or cloud computing system. Such program memories may store instructions, which, when executed by the one or more processors, may cause a system described herein (or individual components of such a system) to implement part or all of one or more techniques described herein. Additional or alternative features described herein may be included in some embodiments.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF DRAWINGS

The figures described below depict various aspects of the present disclosure. It should be understood that each figure depicts an embodiment of a particular aspect of the present disclosure. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein:

FIGS. 5A and 5B each depict an exemplary table of real-time telematics data for a group of vehicles, in accordance with aspects of the present technology.

FIGS. 6A, 6B, and 6C each depict an exemplary table of historical telematics data for a group of vehicles, in accordance with aspects of the present technology.

Figure 1:
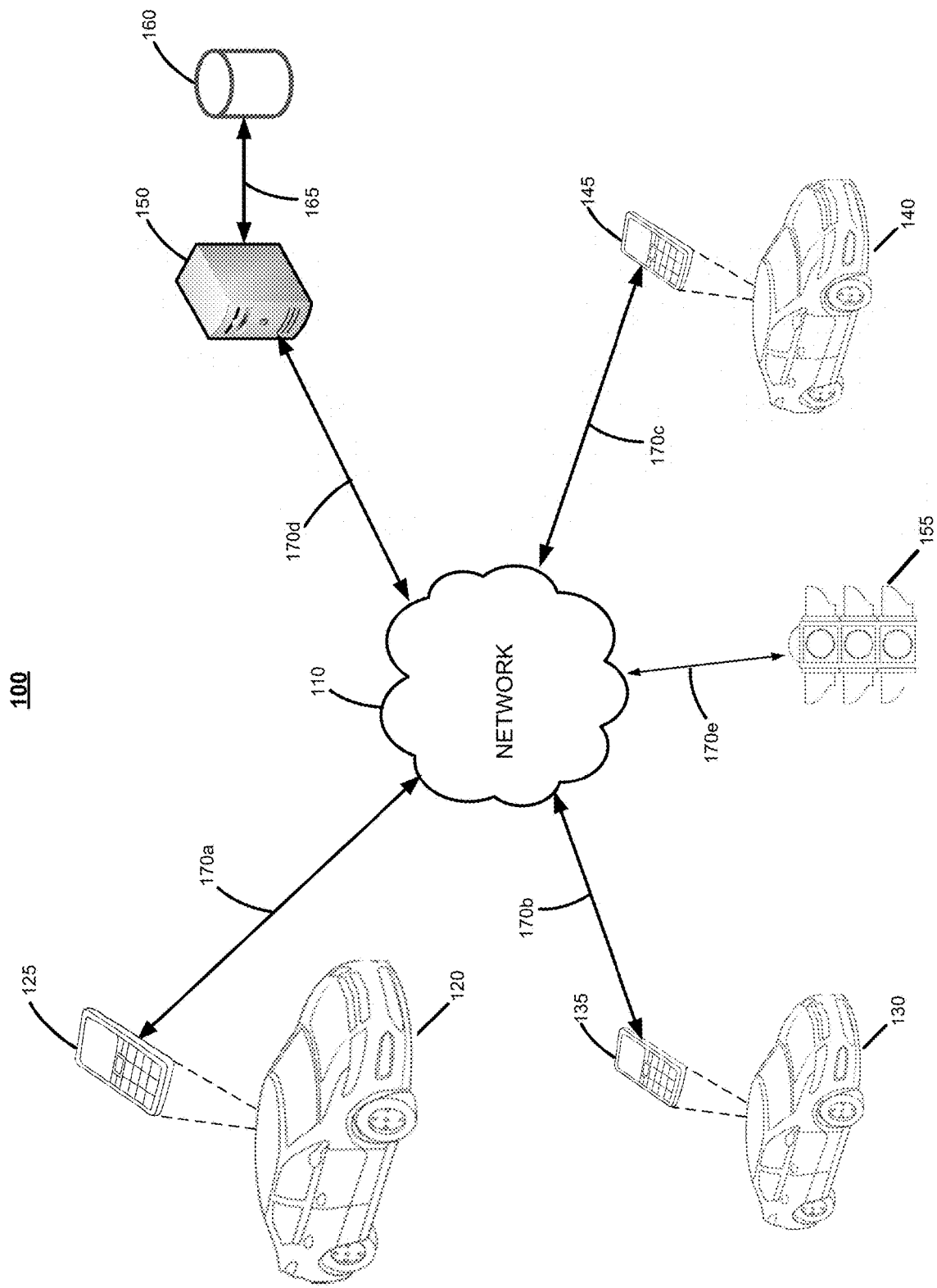
FIG. 1 depicts an exemplary automobile insurance risk assessment rating system, in accordance with aspects of the present technology.

The figures depict aspects of the present invention for purposes of illustration only. One skilled in the art will readily recognize from the following discussion that alternate aspects of the structures and methods illustrated herein may be employed without departing from the principles of the invention described herein.

DETAILED DESCRIPTION

The present embodiments relate to, inter alia, using a vehicle's relative speed to determine an automobile insurance risk assessment rating for one or more vehicle operators whom may be insured by an insurance provider. Again, there is typically a posted speed limit that vehicles should adhere to, but other conditions (e.g., road construction, weather, traffic, etc.) and the velocity of other vehicles on the same roadway may cause vehicle operators to deviate from this posted speed limit. Therefore, risk is better assessed by comparing a driver's performance to other similarly-situated drivers (and/or autonomous vehicles) rather than a static, unchanging constant such as a posted speed limit.

The aspects described herein leverage collected vehicle telematics data (which may include or indicate vehicle velocity) to determine an average velocity for a group of vehicles that are undergoing similar conditions as a particular "target" vehicle for which a risk assessment is sought. For example, these conditions may include other vehicles in the vicinity of the target vehicle (e.g., a threshold distance from the target vehicle) and/or vehicles traveling in the same direction on the same roadway and at the same time as the target vehicle (and thus being exposed to the same weather and road conditions). Based upon the average velocity of the group of vehicles, an average velocity differential may be calculated as a difference between the target vehicle's velocity and the average velocity of the group of vehicles. The telematics data may include vehicle speed, acceleration, cornering, braking, direction, route, heading, GPS information (e.g., speed and location), other location data, and other information.

Additionally, the aspects described herein may determine an automobile insurance risk assessment rating for an insured individual (i.e., the vehicle operator) based upon the aforementioned average velocity differential. This calculated automobile insurance risk assessment rating may then be used by an insurance provider to determine and/or update the insured individual's automobile insurance premium. Moreover, the aspects described herein may alert the insured individual of a change in the automobile risk assessment rating and provide an updated automobile insurance premium via an electronic device that is associated with the individual and/or the vehicle. Further, the aspects described herein may provide suggestions or a set of recommendations to the insured individual to improve his or her automobile insurance risk assessment rating, thereby lowering the insured individual's automobile insurance premium.

Exemplary Technical Advantages

The aspects described herein offer numerous benefits. In particular, vehicle operators may be more motivated to drive or operate a vehicle (e.g., an autonomous vehicle) in a safer manner if there is a risk that their automobile insurance premium may increase. Additionally, the incentive of obtaining a lower automobile insurance premium because of safer driving or vehicle operation may also motivate individuals to drive in a safer manner. Further, safer roadways may prevent accidents and collisions, which may in turn prevent property damage, injury, and death. It should be appreciated that these are only some examples, and that other benefits are also envisioned.

The aspects discussed herein address challenges that are specific to determining an automobile insurance risk assessment rating. In particular, these challenges relate to difficulties related to effectively evaluating an individual's driving behavior or vehicle operation to properly assess risk, and in turn accurately calculating an automobile insurance premium based upon this risk. Conventionally, an automobile insurance premium may not change during the term of the automobile insurance policy unless some intervening event occurs, such as a claim being made by an insured individual or the insured individual being cited for traffic violations such as speeding, for example. Consequently, an individual that has not been involved in a collision or has little or no tickets on his record over the past few years may obtain an automobile insurance policy with a low premium, although the individual may actually exhibit very poor (i.e., high risk) driving behavior. For example, an individual who typically speeds may not have any speeding tickets on record because the individual uses a radar detector. In other words, even though the individual does not have any speeding tickets on record, the individual does not actually exhibit safe driving behavior.

Therefore, the techniques discussed herein use a target vehicle's relative velocity to determine a relative velocity of a target vehicle as an average velocity differential between the target vehicle and other vehicles traveling proximate to the target vehicle and/or on the same roadway at the same time as the target vehicle. In various aspects, the average velocity differential may be based upon an average velocity of the other vehicles, which may be calculated based upon the real-time velocity of the other vehicles or based upon stored historical velocity data. Additionally, the various aspects described herein may determine an automobile insurance risk rating for the operator of the target vehicle based upon this average velocity differential of the target vehicle, which may result in adjustments to the target vehicle operator's automobile insurance premium. Thus, individuals will be motivated to be safer drivers because of the risk of having to pay higher premiums and the incentive of lower premiums.

Further, because the aspects described herein employ the collection, compiling, storing, and displaying of data associated with a target vehicle and its operator, the aspects are necessarily rooted in computer technology to overcome the noted shortcomings that specifically arise in the realm of using a vehicle's relative speed to determine an automobile insurance risk assessment rating. Accordingly, the aspects described herein provide advantages via the ability to access real-time telematics data and/or historical telematics data for several vehicles.

Similarly, the aspects described herein also provide improvements to various technical fields. Namely, these technical fields include sensor data processing, generating an automobile insurance risk assessment rating, and adjusting a calculated automobile insurance premium based upon the automobile insurance risk assessment rating. Instead of merely being performed by hardware components using basic functions, the aspects described herein employ a unique combination of complex steps that go beyond the mere concept of simply retrieving and combining data using a computer.

In particular, the hardware components described herein may capture sensor data, analyze the sensor data, calculate a relative target vehicle velocity with respect to other nearby vehicles, calculate an automobile insurance risk assessment rating and premium, communicate the updated automobile insurance risk assessment rating and premium to the individual via an electronic device, and provide the individual with recommendations on how to improve the individual's automobile insurance risk assessment rating, thus lowering the individual's automobile insurance premium. This combination of elements further imposes meaningful limits in that the operations are applied to improving sensor data processing and determining an updated automobile insurance risk assessment rating and premium for an individual, so that the individual may be motivated to drive more safely, improve traffic safety, and reduce the risk of an accident, injury, or death to the individual or others.

The aspects described herein may support dynamic, real-time, or near real-time analysis of any captured, received, and/or detected data. In particular, an electronic device (e.g., a smart phone) may receive data about an updated automobile insurance risk assessment rating and premium for an individual in real-time or near real-time, and may generate recommendations to improve the individual's automobile insurance risk assessment rating and premium in real-time or near real-time. In this regard, a vehicle operator is afforded the benefit of an insurance premium that represents an accurate representation of his/her driving behavior, as well as recommendations to improve his/her driving behavior to create a safer vehicle environment.

System Overview

FIG. 1 depicts an exemplary automobile insurance risk assessment rating system, in accordance with aspects of the present technology. In various aspects, the system 100 may include one or more network(s) 110, remote server(s) 150, database(s) 160, one or more smart infrastructure components 155, and one or more vehicles 120, 130, and 140, each of which is associated with an electronic device 125, 135, and 145, respectively. Although FIG. 1 illustrates one network 110, one remote server 150, one database 160, one smart infrastructure component 155, and three vehicles 120, 130, and 140 with associated electronic devices 125, 135, and 145, it is to be understood that system 100 may include any suitable number of such components.

In certain embodiments, the network(s) 110 may support any suitable number and/or type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The network(s) 110 may also be one or more private or local networks or dedicated frequency bands.

Each of electronic devices 125, 135, and 145 may communicate via the network(s) 110 via radio links 170*a*-170*c*, respectively. The electronic devices 125, 135, and 145 may additionally or alternatively communicate with one other and/or the remote server 150 via the network(s) 110. For example, the electronic devices 125, 135, and 145 may be located in each of vehicles 120, 130, and 140, respectively, and thus collect and transmit telematics data for each of vehicles 120, 130, and 140 to the remote server 150. In various aspects, the electronic devices 125, 135, and 145 may be implemented as any suitable type of device, which may be integrated as part of the vehicle in which it is located or as a portable device separate from the vehicle. For example, the electronic devices 125, 135, and 145 may be implemented as mobile electronic devices, such as smartphones or as integrated components such as on-board vehicle computers. The vehicles 120, 130, 140 may be human operated, or autonomous or semi-autonomous vehicles, in some embodiments. It should be appreciated that other types of electronic devices and/or mobile devices are envisioned, such as notebook computers, tablets, phablets, GNSS-enabled devices, smart watches, smart glasses, smart bracelets, wearable electronics, PDAs (personal digital assistants), pagers, computing devices configured for wireless communication, etc.

Moreover, although not shown in FIG. 1, one or more of vehicles 120, 130, and 140 may likewise communicate with other vehicles, other electronic devices 125, 135, and 145, one or more smart infrastructure components 155, and/or the remote server 150 directly (e.g., via a separate link not shown in FIG. 1 for purposes of brevity) and/or indirectly (e.g., via one or more electronic devices 125, 135, and 145 as a "relay" or "proxy" and/or via one or more via network(s) 110). Embodiments in which one or more of vehicles 120, 130, and 140 may communicate with other devices, such as remote server 150, may be particularly useful when one or more of vehicles 120, 130, and 140 is configured to measure, generate, collect, and/or transmit telematics data independently of the electronic devices 125, 135, and 145. For example, embodiments include one or more of vehicles 120, 130, and 140 being configured with any suitable number and/or type of sensors to measure telematics data. This telematics data may include the same type of data measured by the electronic devices 125, 135, and 145 or different types of data. For example, one or more of vehicles 120, 130, and 140 may include specialized sensors that may be configured to measure different metrics (or the same metrics) as the one or more electronic devices 125, 135, and 145.

These specialized and/or integrated sensors are not shown in FIG. 1 for purposes of brevity. However, examples of the telematics data generated by such sensors associated with one or more of vehicles 120, 130, and 140 may include data measured by radar, ultrasonic sensors, LIDAR, global navigation satellite system (GNSS) enabled devices, etc. Therefore, the telematics data may include data indicating the relative speed and range between a particular vehicle and surrounding vehicles, which may be used (e.g., via remote server 150) to identify the velocity of other vehicles proximate to a target vehicle. Additionally or alternatively, the sensors associated with one or more of vehicles 120, 130, and 140 may generate data (which is then included in a telematics data transmission) indicative of changes in the vehicle's geographic position over time, changes in the vehicle's velocity over time, weather conditions, road conditions, etc. The details of the telematics data and additional examples of the type of information that may be included in the telematics data transmission are further discussed below.

Smart infrastructure component 155 may be implemented as any suitable type of traffic infrastructure component configured to receive communications from and/or to send communications to other devices, such as other vehicles 120, 130, 140, other electronic devices 125, 135, and 145, and/or the remote server 150 directly (e.g., via a separate link not shown in FIG. 1 for purposes of brevity) and/or indirectly (e.g., via link 170e in conjunction with one or more via network(s) 110 or via one or more electronic devices 125, 135, and 145 functioning as a "relay" or "proxy"), for example. In various aspects, smart infrastructure component 155 may be implemented as a traffic light, a railroad crossing light, a construction notification sign, a roadside display configured to display messages, a billboard display, etc.

In various aspects, the smart infrastructure component 155 may be configured with any suitable number and/or type of sensors to measure telematics data. This telematics data may include the same type of data measured by the electronic devices 125, 135, and 145 (and/or the vehicles 120, 130, and/or 140), or different types of data. For example, the smart infrastructure component 155 may include integrated and/or specialized sensors that are not shown in FIG. 1 for purposes of brevity. Similar to the data measured by one or more of vehicles 120, 130, and/or 140 as discussed above, examples of the telematics data generated by sensors associated with the smart infrastructure component 155 may include data measured by radar, ultrasonic sensors, LIDAR, global navigation satellite system (GNSS) enabled devices, etc. However, given that the smart infrastructure component 155 may be stationary and have a dedicated source of AC power compared to the vehicles 120, 130, and/or 140, aspects include smart infrastructure collecting, measuring, generating, and/or transmitting telematics data in a manner that leverages these advantages. For example, the smart infrastructure 155 may be configured to utilize a dedicated connection to the remote server 150 given that it is not moving and cellular tower handoffs are not required. To provide another example, the smart infrastructure component 155 may be configured with more accurate, sophisticated, and/or power-intensive sensors or other components than cannot feasibly be implemented using a vehicle's battery-powered system.

In various aspects, the telematics data measured by the smart infrastructure component 155 may likewise include data indicating the relative speed and range between a particular vehicle and surrounding vehicles, which may be used to identify other vehicle's speed proximate to a target vehicle. Additionally or alternatively, the sensors associated with the smart infrastructure component 155 may generate data (which is then included in a telematics data transmission) indicative of changes in one or more vehicle's geographic position over time, changes in one or more vehicle's velocity over time, weather conditions, road conditions, etc.

Remote server 150 may be configured to communicate with one or more vehicles 120, 130, and/or 140, one or more electronic devices 125, 135, and/or 145, and/or one or more smart infrastructure components (e.g., the smart infrastructure component 155) directly and/or indirectly (e.g., via the network(s) 110 using any suitable number and/or type of wired and/or wireless links, represented in FIG. 1 as link 170d). Similarly, links 107a-170c also represent any suitable number and/or type of wired and/or wireless links, although a single link 170a-170d in shown in FIG. 1 for purposes of brevity. The remote server 150 may also interface with a database 160 via link 165. In another aspect, the database 160 may be integrated as part of or otherwise built into the remote server 150. The database 160 may contain or store any suitable type and amount of various information and data. In one implementation, the database 160 may store historical telematics data associated with a plurality of other vehicles that were previously operated by a plurality of drivers. The database 160 may also store other information such as automobile insurance policy information, personal information of insured individuals, etc.

In various aspects, each of the one or more vehicles 120, 130, and/or 140, one or more electronic devices 125, 135, and/or 145, and/or one the smart infrastructure component 155 may transmit a unique identifier (e.g., in the telematics data transmission or as part of the telematics data itself) such that the telematics data transmitted by each device may be later correlated to each device via the remote server 150. To this end, aspects include the remote server 150 receiving telematics data or other suitable data from one or more components of system 100, such as one or more vehicles 120, 130, and/or 140, one or more electronic devices 125, 135, and/or 145, and/or one or more smart infrastructure components (e.g., the smart infrastructure component 155).

The remote server 150 may process this data to track the velocity of one or more vehicles over time and to determine an average velocity differential between a particular (i.e., "target") vehicle and one or more other vehicles proximate to the target vehicle driving under the same driving conditions, time of day, road, etc. Based upon this analysis, the remote server 150 may determine a risk assessment rating for an insured driver associated with the target vehicle and, based upon changes in this rating over time, update information associated with the insured driver's insurance account information, such as premiums, qualifying discounts, etc. The remote server 150 may then transmit information related to an automobile insurance risk assessment rating and/or the insured driver's insurance account information (e.g., an automobile insurance premium) to one or more of the electronic devices 125, 135, and 145. The operation of the remote server 150 is further discussed below.

Detailed Operation of an Exemplary Remote Server

Figure 2:
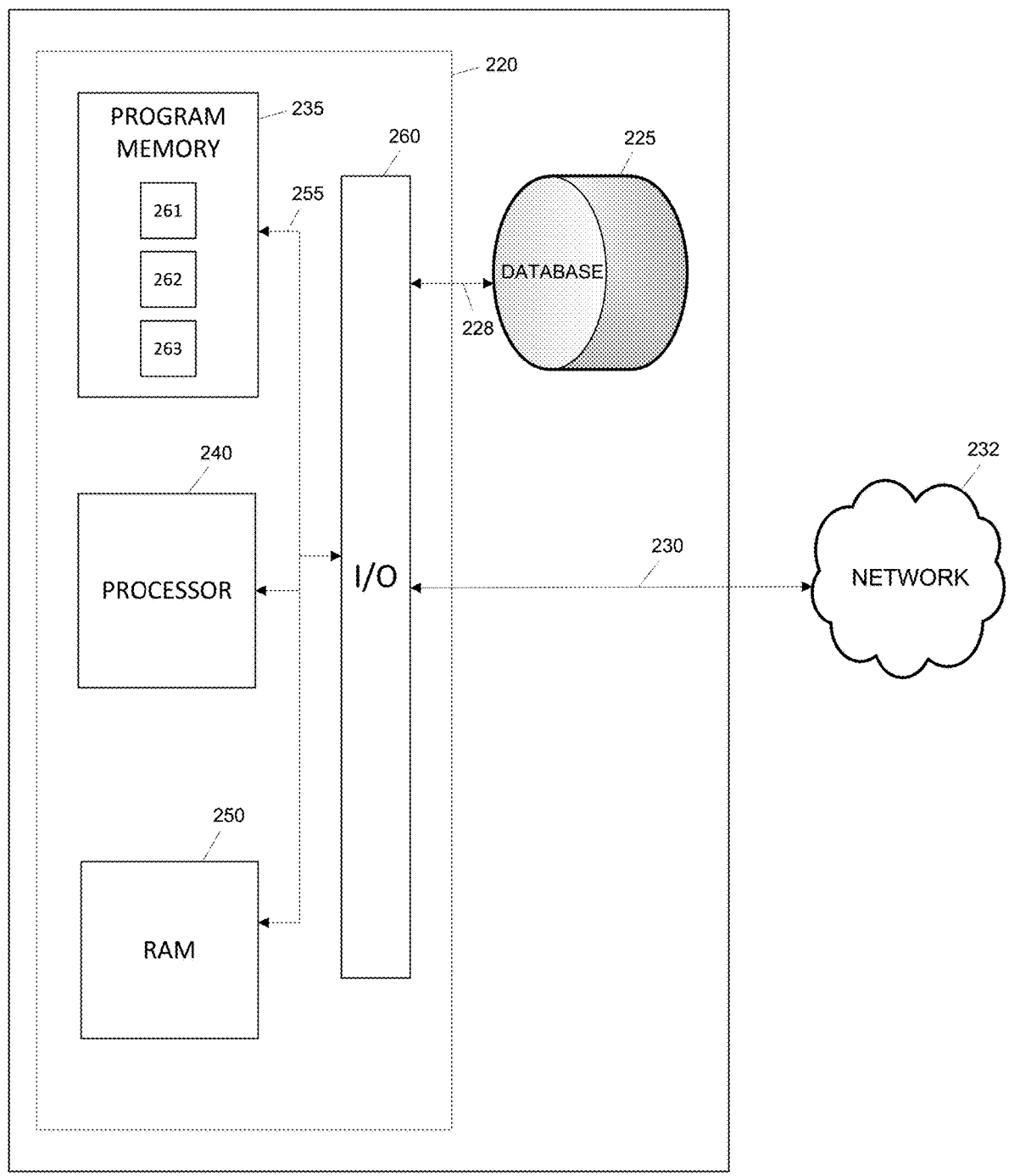
FIG. 2 depicts a block diagram of an exemplary remote server, in accordance with aspects of the present technology.

FIG. 2 depicts a block diagram of an exemplary remote server 200, in accordance with aspects of the present technology. In one embodiment, remote server 200 may be an implementation of remote server 150, as shown and discussed with respect to FIG. 1. It should be noted that, although only a single server 200 is shown in FIG. 2, this is only one of many embodiments. In some embodiments, multiple servers 200 may be configured to have a logical presence of a single entity, such as a server bank or an arrangement known as "cloud computing." These configurations may provide various advantages, such as enabling near real-time uploads and downloads of information as well as periodic uploads and downloads of information. However, for ease of discussion and not limitation, the server 200 is referred to herein using the singular tense.

In one aspect, the server 200 may include one or more controllers 220 that are operatively connected to a data storage device 225, which may include any suitable device such as a database, for example, (e.g., the database 160, as discussed with respect to FIG. 1) via link 228 and/or 230, which may include one or more local, wired, wireless, and/or remote links. The server 200 may access data stored in the data storage device 225 when executing various functions, tasks, and/or techniques associated with determining an automobile insurance risk assessment rating. It should be noted that although FIG. 2 depicts a single data storage device 225, aspects include the data storage device 225 being implemented as multiple physical data storage entities, such as a data bank or a data farm.

In various aspects, the data storage device 225 may be adapted or configured to store data related to historical telematics data obtained from a plurality of other vehicles that were previously operated by a plurality of drivers. Additionally or alternatively, the data storage device 225 may store data related to current and historical automobile insurance risk assessment ratings for an individual such as insurer data including personal information of the individual, vehicle information (e.g., vehicle make, vehicle model, VIN, etc.), information about the individual's automobile insurance policy, etc. In various aspects, at least some of the data stored at the data storage device 225 may be determined or generated based upon at least a portion of the historical telematics data. The data storage device 225 may additionally or alternatively store other types of data used to calculate a risk assessment rating such as weather-related data, geofence and/or mapping data, etc.

As further discussed herein, the telematics data collected by the remote server 200 from the various electronic devices (e.g., electronic devices 125, 135, and 145, as shown in FIG. 1) may be received in a periodic or continuous fashion. Thus, the telematics data received by the remote server 200 may represent various data points received from each electronic device, which are stored in the data storage device 225 and time-stamped or otherwise time correlated. Additionally, the telematics data may be transmitted with an indication of a geographic location of each electronic device when the telematics data was transmitted by each device. Thus, the various data points stored in the data storage device 225 may also include an indication of a respective geographic location of each electronic device. In this way, the telematics data points stored in the data storage device 225 may be correlated to when and where each telematics data point was collected over time.

It should be further noted that, while not shown, additional data storage devices or entities may be linked to the controller(s) 220 in any suitable manner, e.g., locally and/or remotely. For example, additional databases and/or data storage devices (not shown) that store various types of information (such as vehicle accidents, road conditions, vehicle insurance policy information, driver performance, or vehicle use information) may be locally and communicatively connected to the controller(s) 220 and/or to the server 200. Additional databases or data storage devices (not shown) may be remotely communicatively connected to the controller(s) 220 and/or to the server 200 via one or more links 230 to one or more networks 232, and may store data maintained by third parties (e.g., weather databases, road construction databases, traffic congestion databases, road network databases, IoT (Internet-of-Things) or sensor databases implemented by a city or other jurisdiction, etc.). In one embodiment, the one or more networks 232 may include the network 110, as shown and discussed with respect to FIG. 1.

In various aspects, the controller 220 may include one or more program memories 235, one or more processors 240 (which may be called a microcontroller or a microprocessor), one or more random-access memories (RAMs) 250, and an input/output (I/O) circuit 260, all of which may be interconnected via an address/data bus 255. It should be appreciated that although only one microprocessor 240 is shown, the controller 220 may include multiple microprocessors 240. Similarly, the memory of the controller 220 may include multiple RAMs 250 and multiple program memories 235, if desired. Although the I/O circuit 260 is shown as a single block in FIG. 2, it should be appreciated that the I/O circuit 260 may include a number of different types of I/O circuits. The RAM 250 and program memories 235 may be implemented as any suitable type of memory, such as semiconductor memories, magnetically readable memories, biologically readable memories, or optically readable memories, for example. The controller 220 may also be operatively connected to the network 232 via the link 230.

The controller 220 may further include a number of applications 261-263 stored in its program memory 235. In one embodiment, the applications 261-263 comprise one or more software applications or sets of computer-executable instructions that are stored on the program memor(ies) 235 and executable by the processor(s) 240. For example, program memory 235 may represent a tangible, non-transitory computer-readable medium, with each of the applications 261-263 including instructions executable by one or more processors (e.g., controller 220 and/or processor 240) that, when executed by the one or more processors, cause the one or more processors to perform various acts as described herein. To provide another example, the applications 261-263 may be implemented at least partially in firmware and/or in hardware at the server 200.

The various applications may be executed on the same computer processor 240 or on different computer processors 240 in embodiments, as desired. Further, while the various applications 261-263 are depicted as separate applications, two or more of the applications 261-263 may be integrated as an integral application, if desired. In some embodiments, at least one of the applications 261-263 may be implemented in conjunction with another application (not shown) that is stored and executed at the server 200, such as a navigation or routing application.

In various aspects, the applications 261-263 may include a log generation application 261 configured to generate and record logs including telematics data collected from various vehicles (i.e., from electronic devices associated with the various vehicles) as well as previously recorded automobile insurance risk assessment ratings for individuals. The applications 261-263 may also include a vehicle relative speed application 262 configured to calculate a target vehicle's relative speed as an average velocity differential between the target vehicle's speed and an average speed of other nearby vehicles. As further discussed herein, this calculation may be performed by correlating a vehicle's velocity at a particular location and time to other vehicles at a similar location and time, averaging the velocity of the correlated vehicles, and comparing this averaged velocity to that of the target vehicle. By performing this calculation over time, server 200 may store the target vehicle's relative velocity calculation over time (e.g., in data storage device 225), which may be analyzed to determine an automobile insurance risk assessment rating, as further discussed below.

The applications 261-263 may also include an automobile insurance risk assessment rating (RAR) application 263. The automobile insurance RAR application 263 may be configured to calculate automobile insurance risk assessment ratings and to otherwise update an insured driver's insurance account information. For example, automobile insurance RAR application 263 may cause the remote server 200 to access or otherwise communicate with one or more other servers, databases, etc., to securely update insurance account information such as an insured driver's risk assessment rating, qualifying safe driver discounts, and/or automobile insurance premiums. Again, this information may be updated based upon the aforementioned relative velocity of a target vehicle and/or the respective automobile insurance risk assessment rating resulting from this relative velocity tracked over time. Additionally, the automobile insurance RAR application 263 may facilitate remote server 200 calculating updated automobile insurance risk assessment ratings and automobile insurance premiums. The details associated with these calculations are further discussed below.

Detailed Operation of an Exemplary Electronic Device

Figure 3:
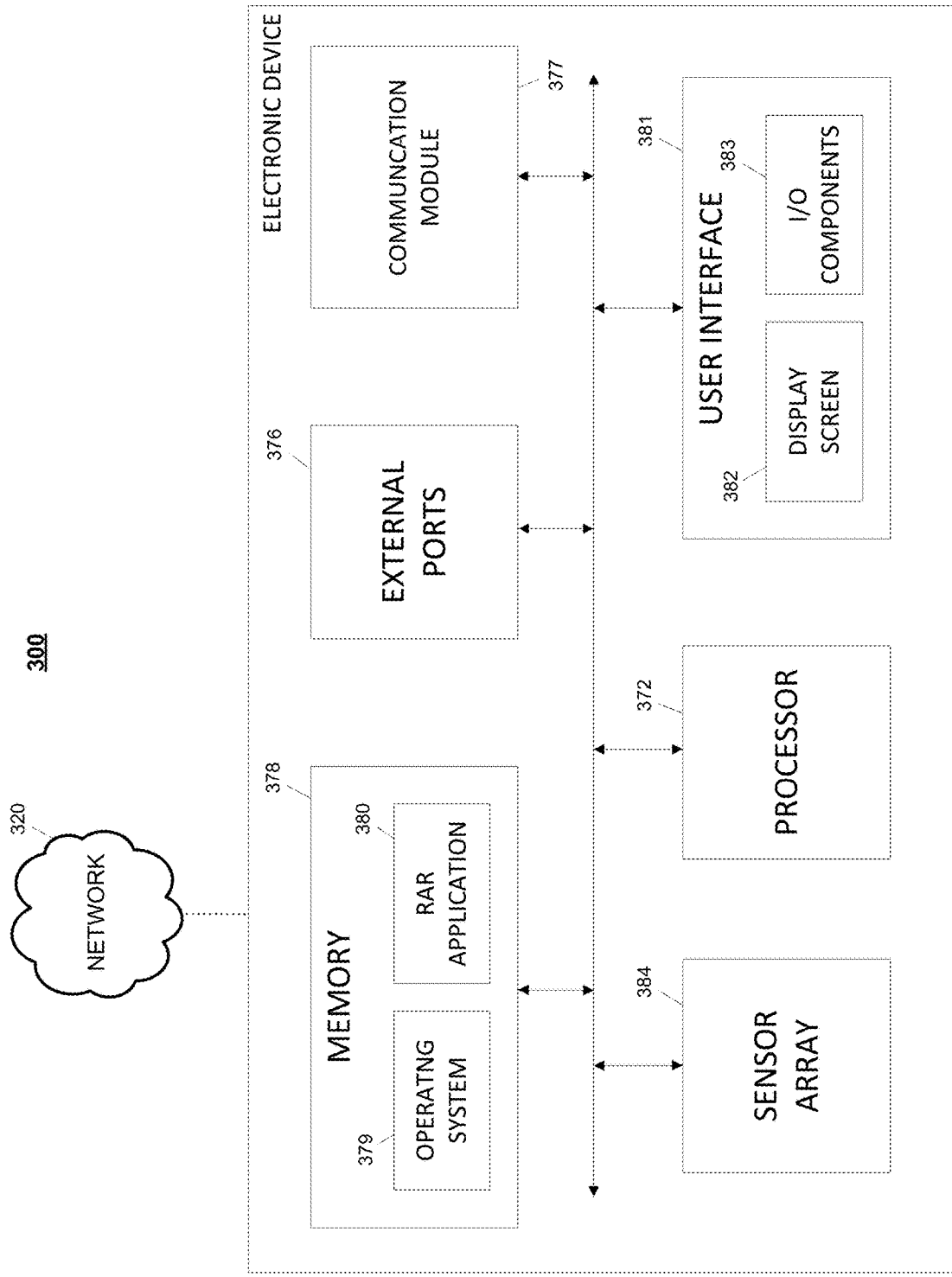
FIG. 3 depicts a block diagram of an exemplary electronic device, in accordance with aspects of the present technology.

FIG. 3 depicts a block diagram of an exemplary electronic device, in accordance with aspects of the present technology. FIG. 3 illustrates a diagram of an exemplary mobile or other electronic device 300 (such as one of the electronic devices 125, 135, and/or 145 as discussed with respect to FIG. 1) in which the functionalities as discussed herein may be implemented. Again, aspects include electronic device 300 being configured to be transported in a vehicle and/or connected to an on-board telematics platform of the vehicle, as discussed herein. Further, aspects include the electronic device 300 being integrated into an on-board system of the vehicle. In various aspects, any portion of processing performed via server 200 may be performed via the electronic device 300.

In certain aspects, the electronic device 300 may include a processor 372 and a memory 378. The memory 378 may store an operating system 379 and a risk assessment application 380. For example, memory 378 may represent a tangible, non-transitory computer-readable medium, with each of the operating system 379 and the risk assessment application 380 including instructions executable by one or more processors (e.g., processor 372) that, when executed by the one or more processors, cause the one or more processors to perform various acts as described herein. The memory 378 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Furthermore, a computer program product in accordance with an aspect may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 372 (e.g., working in connection with the operating system 379) to facilitate the functions as described herein. In this regard, the program code may be implemented In any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

For example, the operating system 379 may represent an initial operating system utilized by the electronic device 300. That is, if the electronic device 300 is implemented as a smartphone, then operating system 379 may include one or more files, applications, code, etc., to facilitate user interaction with and operation of the electronic device 300.

The risk assessment application 380 may include an application that is downloaded to or otherwise installed onto the electronic device 300. In various aspects, the risk assessment application 380 may collect and transmit telematics data and/or other types of data in the background and/or while an operator is driving a vehicle via communication module 377. For example, the risk assessment application 380 may monitor sensor data collected via the sensor array 384 and transmit this data to a server (e.g., server 200), as further discussed below. The risk assessment application 380 may also monitor or otherwise collect other types of data, which may be transmitted with or separate from the sensor data transmissions such as time when sensor data was collected, weather conditions (e.g., received via external communications), data identifying the vehicle operator, etc. The data transmitted by the electronic device 300 in this manner, which may include sensor data and other types of data (e.g., geographic location data), may collectively be referred to herein as "telematics data."

Moreover, as used herein, the term "telematics data" may refer to any suitable type of data that may be used to identify a particular device, a particular driver, driving behavior or habits, road conditions, vehicle locations, users, a vehicle's movement while being driven, etc., regardless of the particular component or source that generates the telematics data. For example, telematics data may include the aforementioned sensor metrics generated by one or more components of the electronic device 300, such as sensor metrics and/or geographic location data generated by measured by the sensor array 384. To provide another example, the telematics data may include information generated by one or more sensors, controllers, or other suitable components of a particular vehicle (e.g., vehicles 120, 130, and/or 140, as discussed above with reference to FIG. 1). To provide yet another example, the telematics data may include information generated by one or more sensors or portion of a smart infrastructure.

To provide an illustrative example, the telematics data may include, regardless of the device generating it, sensor metrics or other information indicating changes in a vehicle's acceleration, braking, cornering, and/or velocity over time, which may include a timestamp associated with the sampled telematics data to allow each sampled data point to be associated with a specific time, thereby facilitating tracking changes in the telematics data over time. To provide yet another example, the telematics data may include sensor metrics or other information related to accelerometer sensor measurements, gyroscope sensor measurements, compass heading measurements, etc. To provide further examples, the telematics data may include information indicative of changes in the geographic location of a particular electronic device and/or vehicle, which may likewise be correlated to a time stamp to identify the movement of a vehicle over time, and thus track its velocity and/or route over time.

Still further, the telematics data may include information indicative of a usage of an electronic device (e.g., a log indicating when the user was texting or talking on the phone while driving), and/or a battery level associated with the first mobile computing device. To provide even more examples, the telematics data may include unique information identifying a particular user, vehicle, or smart infrastructure component. The telematics data may also include data identifying certain weather conditions, which may be measured by a particular device or retrieved from a separate data source via data communications by that device and included in a subsequent telematics data transmission. This list is not meant to be exhaustive or limiting, and it will be understood that other types of information may be included in the telematics data transmission not listed here in accordance with the aspects described herein without departing from the spirit and scope of the present disclosure.

The electronic device 300 may further include a communication module 377 configured to communicate data via one or more networks 320. According to some embodiments, the communication module 377 may include one or more transceivers (e.g., WWAN, WLAN, and/or WPAN transceivers) functioning in accordance with IEEE standards, 3GPP standards, or other standards, and configured to receive and transmit data via one or more external ports 376. Further, the communication module 377 may include a short-range network component (e.g., an RFID reader) configured for short-range network communications. For example, the communication module 377 may transmit telematics data to one or more other devices (e.g., sever 200) as discussed above. To provide another example, the communication module 377 may receive data and/or notifications from other devices (e.g., server 200) regarding the insured individual's current risk assessment, premium, or updated thereof, which may then be displayed via display screen 382.

The electronic device 300 may further include a sensor array 384. The processor 372 and the risk assessment application 380 may be configured to interface with the sensor array 384 to retrieve and process the corresponding sensor data. The sensor array 384 may include one or more sensors configured to collect various types of sensor data, such as velocity data, for example. In various aspects, the sensor array 384 may include one or more cameras, accelerometers, gyroscopes, velocity sensors, magnetometers, barometers, thermometers, proximity sensors, light sensors, Hall Effect sensors, etc. In aspects in which the sensor array 384 includes one or more accelerometers, the sensor array 384 may be configured to measure and/or collect accelerometer values utilizing an X-axis, Y-axis, and Z-axis accelerometer. In accordance with such aspects, the sensor array 384 may measure sensor metric values as a three-dimensional accelerometer vector that represents the movement of the electronic device 300 in three dimensional space by combining the outputs of the X-axis, Y-axis, and Z-axis accelerometers using any suitable techniques.

In one aspect, the accelerometer movement may then be analyzed (either locally via electronic device 300 or via a server such as server 200) to determine the velocity of the electronic device 300, and thus the velocity of the vehicle in which the electronic device 300 is located. Aspects may also include the sensor array 384 directly measuring the velocity of the electronic device 300 via any suitable sensor. In any event, the sensor array 384 may facilitate measuring the velocity of the electronic device 300 over time in accordance with any suitable sampling period, such as continuously or periodically, for example. Thus, the telematics data transmitted via the electronic device 300 may include an indication of a tracked velocity and direction of the vehicle in which the electronic device 300 is located over time.

In one aspect, the sensor array 384 may additionally include a global navigation satellite system (GNSS) configured to determine the geographic location of electronic device 300. In accordance with such aspects, the global navigation satellite system may generate geographic location data utilizing any suitable global positioning techniques. For example, the GNSS may communicate with one or more satellites and/or wireless transmitters to determine a location of the electronic device 300. The GNSS may use "Assisted Global Positioning System" (A-GPS), satellite GPS, or any other suitable global positioning protocol (e.g., the GLONASS system operated by the Russian government, the Galileo system operated by the European Union, etc.) to determine a geographic location of the electronic device 300. Thus, the telematics data transmitted by the electronic device 300 may additionally include geographic location data.

Some aspects may include the geographic location data being analyzed (either locally via electronic device 300 or via a server such as server 200) to determine the location of the electronic device at different times, which may be correlated to other data included in the telematics data, such as sensor data indicating the velocity of the electronic device 300. Some aspects may also include the geographic location data being analyzed (either locally via electronic device 300 or via a server such as server 200) to track the velocity of a vehicle in which the electronic device 300 is located by calculating changes in the vehicle's position over time based upon the geographic location data.

The electronic device 300 may further include a user interface 381 configured to present information to a user and/or to receive inputs from the user. As shown in FIG. 3, the user interface 381 may include a display screen 382 and I/O components 383 (e.g., ports, capacitive or resistive touch sensitive input panels, keys, buttons, lights, LEDs, speakers, microphones). According to some embodiments, the user may access the electronic device 300 via the user interface 381 to review information and/or perform other functions.

Exemplary Vehicle Environment

Figure 4A:
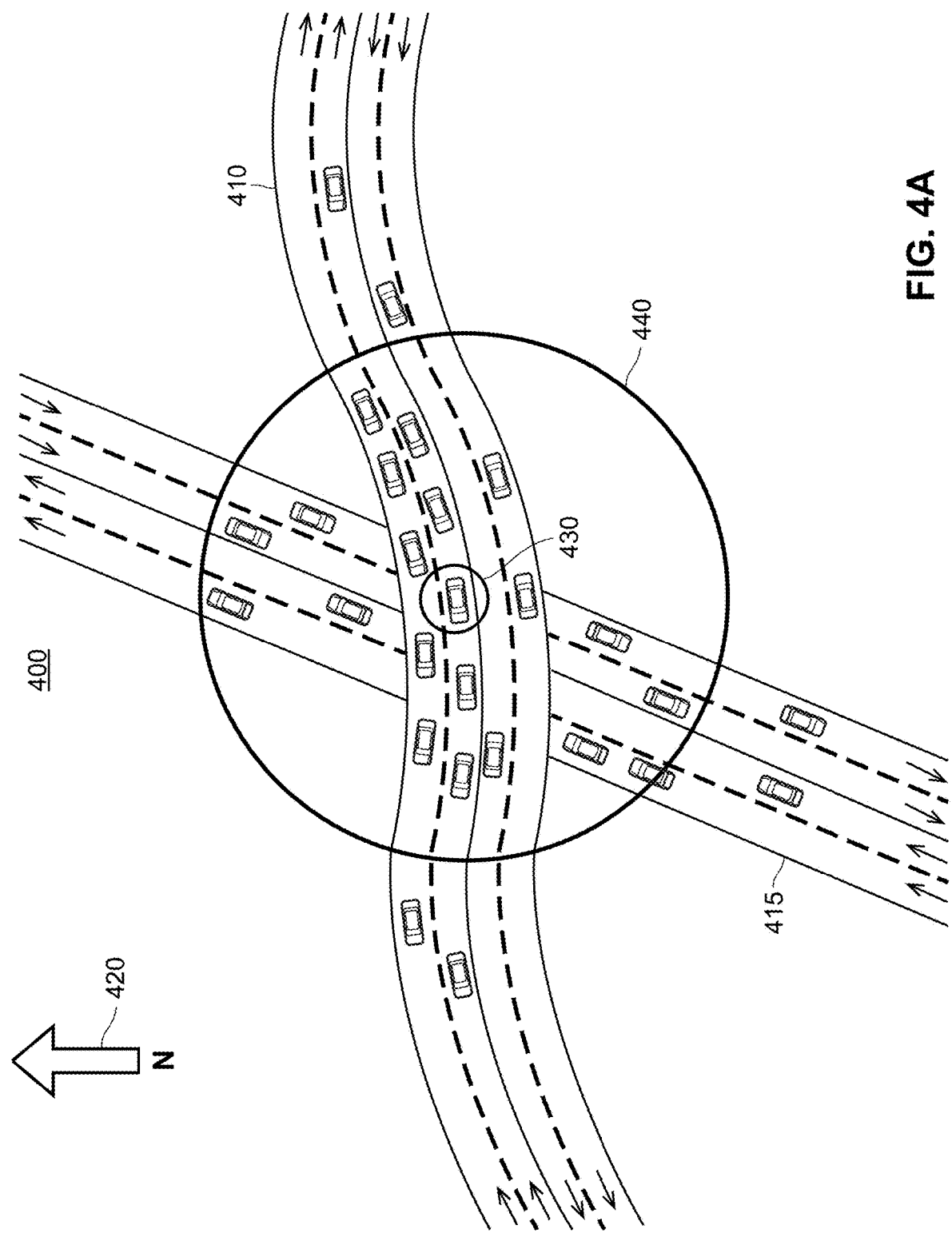
FIGS. 4A and 4B depict exemplary scenarios of the environment surrounding a vehicle in which an automobile insurance risk assessment rating system may be implemented, in accordance with aspects of the present technology.

FIG. 4A illustrates an exemplary scenario 400 depicting a set of vehicles in operation on roadways 410 and 415. The scenario 400 may include a target vehicle 430 travelling on a roadway 410. Again, the target vehicle 430 may be operated by an individual with an automobile insurance policy that has a premium based upon an automobile insurance risk assessment rating of the individual. Additionally, although not shown in FIG. 4A, there may be an electronic device (e.g., the electronic device 125, 135, and/or 145 as discussed with respect to FIG. 1 or the electronic device 300 as discussed with respect to FIG. 3) associated with the individual and/or the target vehicle 430. Further, FIG. 4A illustrates a geofence 440, which represents a distance having a predetermined radius surrounding the target vehicle 430. The geofence 440 may be defined, for example, as a set of geographic coordinates. The geofence 440 will be discussed in more detail below with respect to FIG. 4B.

In addition to the roadway 410, there is another roadway 415 that passes underneath roadway 410. Both roadways 410 and 415 are two-way roadways in which vehicles may travel in either direction along the roadway. A compass 420 indicates the directions of the roadways 410 and 415. Based upon the direction of north ("N") on the compass 420, roadway 410 is aligned substantially in the east/west direction and roadway 415 is aligned substantially in the southwest/northeast direction. The target vehicle 430 is traveling in an eastbound direction along roadway 410. In various aspects, scenario 400 may include more or fewer roadways than the two roadways 410 and 415 as shown in FIG. 4A, and each roadway may be aligned in any suitable direction.

As illustrated in the scenario 400 of FIG. 4A, in addition to the target vehicle 430, there may be several other vehicles (i.e., other than the target vehicle 430) traveling in either direction on both roadway 410 and 415. The other vehicles on roadways 410 and 415 may each be travelling at different velocities and may be travelling in different directions than one another. Additionally, although not shown in FIG. 4A, other conditions may be present such as road constructions and weather conditions (e.g., rain, snow, fog, etc.). Some conditions, such as the weather for example, will affect each of the vehicles regardless of their direction of travel and regardless of the particular road upon which they are driving. Therefore, if the predetermined threshold associated with the geofenced area 440 is relatively small (e.g., a mile or two), it can be assumed that each of the vehicles is likely experiencing these same conditions. However, other conditions, such as road construction, may be specific to not only a particular road, but to a particular direction of travel along that road. Thus, certain aspects may include identifying other vehicles based upon a number of factors to identify those vehicles that are driving in similar conditions as the target vehicle 430. These factors are further discussed below.

Figure 4B:
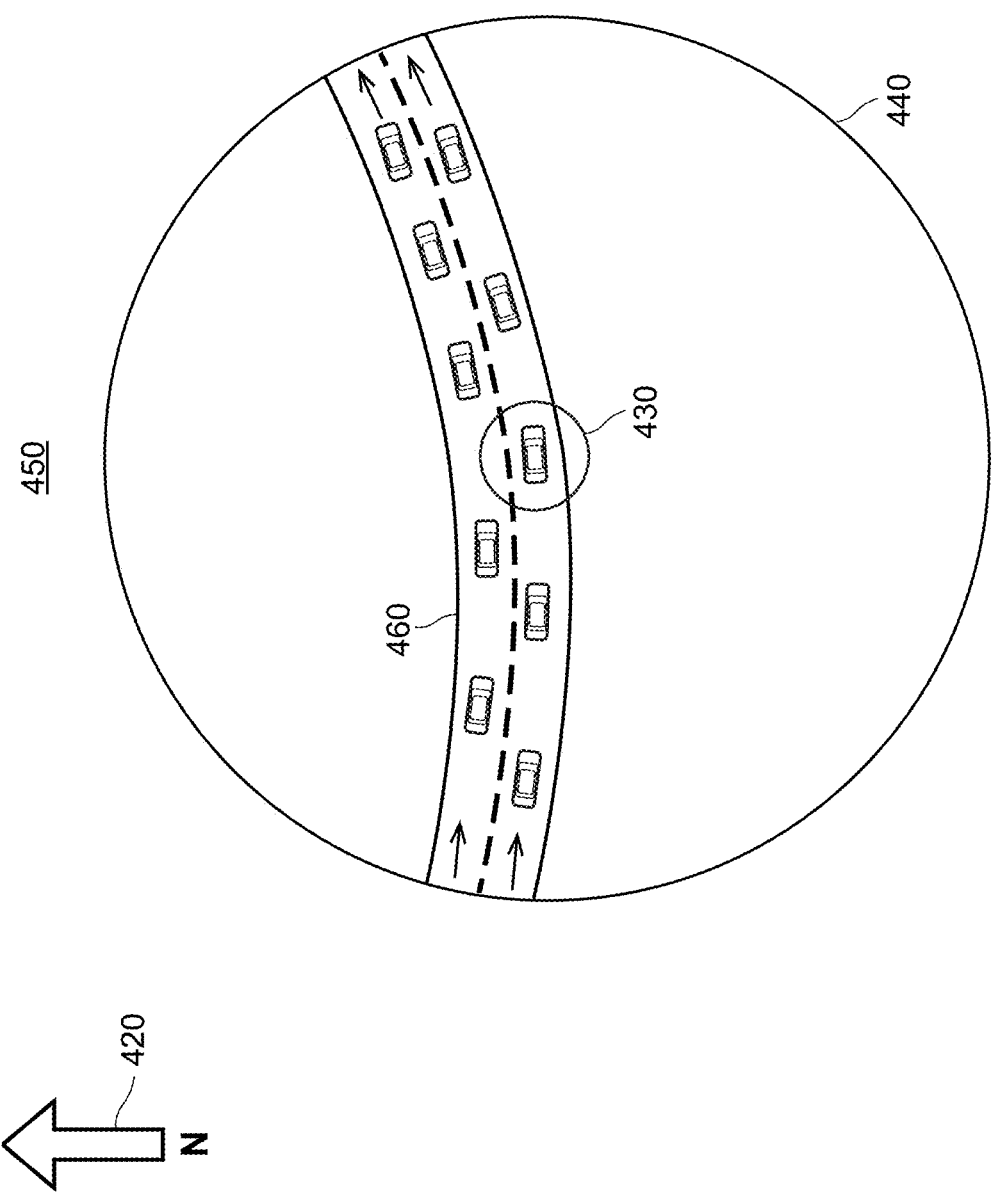

FIG. 4B illustrates an example scenario 450 that represents a portion of the scenario 400 with respect to FIG. 4A. A compass 420 is depicted in the scenario 450 and the compass 420 is oriented the same as the compass 420 with respect to FIG. 4A. The scenario 450 of FIG. 4B also shows the target vehicle 430 from FIG. 4A and the geofence 440 surrounding it. However, the scenario 450 indicates the result of filtering out other vehicles that are not experiencing the same driving conditions as the target vehicle 430. In particular, the scenario 450 illustrates only those other vehicles that satisfy the conditions of (1) being inside the geofence 440, and (2) traveling in the same direction as the target vehicle 430 (and thus being on the same roadway).

Thus, the perimeter of the geofence 440 may be used as a predetermined threshold distance condition from the target vehicle 430. In one aspect, only the telematics data associated with other vehicles within this geofence 440 are initially selected for an average velocity calculation. In the example shown in FIG. 4B, the other conditions specified directly above are also used to determine the set of telematics data associated with other vehicles. However, certain aspects include using any suitable number and type of conditions to identify the set of other vehicles experiencing similar driving conditions as target vehicle 430. For example, aspects include only relying on geofence 440 and not including the vehicle's direction of travel as a condition. Such aspects may be particular useful, for example, when the target vehicle 430 is in a rural area or a less populous one. In some aspects, the number and/or type of conditions used to identify the set of vehicles experiencing similar driving conditions as the target vehicle 430 may by dynamically updated based upon the target vehicle's location, for example.

Additionally or alternatively, aspects include the radius and/or shape of the geofence 440 being determined based upon any suitable number and/or type of conditions such as the type of roadway (e.g., side street, highway, etc.), the geographic location of the target vehicle 430, the velocity of the target vehicle 430, current road conditions, weather conditions, etc. For example, the geofence 440 may initially be a circle having a specific radius in less densely populated areas, but change to a geofence that has a smaller radius or matches the curvature of road 410 when the target vehicle 430 approaches a more urban environment.

Again, as depicted in the scenario 450 of FIG. 4B, only vehicles traveling on the roadway 410 in the same direction as the target vehicle 430 within the geofence 440 are shown. Thus, to calculate an average velocity of other vehicles experiencing similar driving conditions as the target vehicle 430, only telematics data from the other vehicles as shown in scenario 450 are considered.

In one aspect, the vehicles depicted in FIGS. 4A and 4B may indicate a real-time representation of vehicles that are being operated by different drivers on the roadways 410 and 415 within the vicinity of the target vehicle 430. In particular, as shown in scenario 450 of FIG. 4B, the vehicles within the geofence 440 that are traveling in the same direction as the target vehicle 430 on roadway 410 may represent vehicles that are currently traveling on roadway 410 at the same time as target vehicle 430 is traveling on roadway 410. Because the vehicles in this embodiment are present on roadway 410 at the same time as the target vehicle 430, all of the vehicles are experiencing the same road conditions, weather conditions, etc. as the target vehicle 430.

In other aspects, the vehicles depicted in FIGS. 4A and 4B may indicate a historical representation of other vehicles, which were previously operated by drivers on the roadways 410 and 415 within the vicinity of the target vehicle 430. In particular, as shown in scenario 450 of FIG. 4B, the vehicles within the geofence 440 that are traveling in the same direction as the target vehicle 430 on roadway 410 may represent vehicles that have previously traveled along roadway 410 within a particular time period (e.g., a threshold window of time) at a time of day that matches when the target vehicle 430 is traveling on roadway 410. Such aspects may be particularly useful to calculate an average velocity of a larger group of vehicles over a larger period of time (e.g., a month, a year, etc.) to determine a historical average velocity of vehicles are certain times throughout the day. In doing so, the velocity of the target vehicle 430 may be compared at any given time to the historical average velocity of the other vehicles at the same time and place. Alternatively, the velocity of target vehicle 430 may be tracked over several days at the same time, which is then averaged and then compared to the historical average velocity of the other vehicles at the same time and place.

Exemplary Telematics Data

The tables shown in FIGS. 5A-5B and FIGS. 6A-6C and discussed below include several different types of data. In some aspects, this data may represent portions of telematics data that is transmitted by several electronic devices (e.g., electronic devices 125, 135, and 145, as shown in FIG. 1) and received and processed by a computing device (e.g., server 200, as shown in FIG. 2). In various aspects, some (or all) of the telematics data shown in FIGS. 5A-5B and FIGS. 6A-6C and discussed below may be received from telematics data transmitted via an electronic device running a risk assessment application. For example, electronic device 300 may transmit telematics data as a result of processor 372 executing instructions stored in risk assessment application 380, as shown and discussed above with reference to FIG. 3.

However, aspects also include some (or all) of the telematics data shown in FIGS. 5A-5B and FIGS. 6A-6C and discussed below being collected via other applications or data sources. For example, third party applications (e.g., Waze and Google Maps) may be installed on computing devices (e.g., smartphones), which may be located in respective vehicles, thereby enabling each respective computing device to generate, locally store, report, transmit, and/or otherwise provide telematics data or other data from which the telematics data as discussed herein may be derived. In some aspects, the third party applications may also be executed on, for example, the electronic devices 125, 135, and/or 145, whereas other aspects include the third party applications being executed on other computing devices not shown in FIG. 1 for purposes of brevity. Thus, in various aspects, the telematics data may be procured from any suitable combination of the electronic devices 125, 135, and/or 145, vehicles 120, 130, and 140, etc. (e.g., as discussed above with respect to the execution of risk assessment application 380) and/or via third party applications.

In some aspects, the data generated by such third party applications may be part of a "crowdsourcing" or aggregate reporting utility that functions to determine certain types of data, which is then reported to one or more servers used in accordance with the third party application and/or made available to other computing devices running the third party application. In accordance with such aspects, this reported data may include any suitable type of data that may be used in accordance with the various aspects described herein. For example, the reported data may include real time vehicle speed (i.e., the vehicle in which each respective computing device is located), weather information at each computing device location, location data, information regarding road conditions at each computing device location, traffic data, etc. In various aspects, the data reported by the third party applications may be collected via one or more sensors incorporated as part of each computing device and/or information that is manually identified and/or reported by a user.

In any event, the third party applications may be running on any suitable number of computing devices (e.g., several hundred, thousand, million, etc.), which form a "pool" of devices and reported data. This pool of data may then be procured by a remote server (e.g., server 200) in a similar manner as the telematics data discussed herein with respect to electronic devices 125, 135, and 145, vehicles 120, 130, and 140, etc. For example, server 200 may be configured to communicate (e.g., via network 232) with a third party server that supports the third party applications and/or stores data reported by the computing devices executing the third party applications. To provide another example, server 200 may be configured to communicate with the computing devices executing the third party applications to store the reported data to database 225 or another suitable location, which may then be accessed as needed for the various calculations as discussed herein. For instance, the server 200 may implement communications via an application programming interface (API) services call to the computing devices executing the third party application.

In the case when the computing device receiving and processing this data is implemented as the server 200, the filtering actions and other calculations discussed with reference to FIGS. 5A-5B and FIGS. 6A-6C may be performed via execution of instructions via controller 220 and/or processor 240. For example, the logs shown in FIGS. 5A-5B and FIGS. 6A-6C may represent data that is identified, assembled, and/or filtered as a result of the execution of instructions stored in log generation application 261 via processor 240. Additionally, the average velocity calculations shown in FIGS. 5A-5B and FIGS. 6A-6C may be the result of the execution of instructions stored in vehicle relative speed application 262 via processor 240.

Exemplary Real-Time Telematics Data

FIGS. 5A and 5B each depict an exemplary table of real-time telematics data for a group of vehicles, in accordance with aspects of the present technology. FIGS. 5A and 5B illustrate tables 500 and 510, respectively, which correspond to real-time telematics data collected from several electronic devices, each being located in or otherwise associated with a respective vehicle. For example, table 500 may represent telematics data collected from electronic devices associated with a target vehicle 430 and several other vehicles traveling within a geofence 440 having a threshold radius of 0.25 miles, as discussed above with respect to FIGS. 4A and 4B. Because the telematics data shown in FIGS. 5A and 5B is real-time telematics data, the date and time for each telematics data entry (i.e., each row) is the same as the target vehicle (i.e., 5:02 PM).

As shown in tables 500 and 510, each vehicle may be identified by its uniquely identified respective electronic device ID. This electronic device ID may include, for example, any suitable information received in the telematics data transmission that uniquely identifies each individual electronic device. This may include, for example, a media access controller (MAC) address, an International Mobile Equipment Identity (IMEI) number, a phone number, etc. In one aspect, the target vehicle's telematics data may include a unique electronic device ID, which may be used to identify the insured customer. Additionally or alternatively, the target vehicle's telematics data may provide information that directly identifies the insured customer such as a logon ID, for example.

In any event, aspects include the real-time telematics data being collected in a manner such that each vehicle may be uniquely identified and correlated to its own set of telematics data when stored in a database (such as the database 160 as discussed with respect to FIG. 1 and/or the database 225 as discussed with respect to FIG. 2). Additionally, in various aspects, the real-time telematics data for each vehicle may be accessed by an electronic device (such as the electronic devices 125, 135, and 145 as discussed with respect to FIG. 1 and/or the electronic device 300 as discussed with respect to FIG. 3) and/or a remote server (such as the remote server 150 as discussed with respect to FIG. 1 and/or the remote server 200 as discussed with respect to FIG. 2).

Further, each vehicle's real-time telematics data entry in tables 500 and 510 has a specific velocity (in mph) and distance from the target vehicle (in miles) associated with the vehicle on Mar. 22, 2017 at 5:02 PM. The distance entry is illustrated for ease of explanation, and it is to be understood that the data represented by this entry may be calculated in any suitable manner to identify vehicles within the geofence 440. For example, mathematical calculations may be performed to calculate a difference between the geographic coordinates of each vehicle (which may be included as part of the telematics data) compared to the target vehicle.

FIG. 5A depicts a table 500 of real-time telematics data filtered by the geofence 440. In other words, table 500 indicates telematics data entries for a target vehicle (e.g., target vehicle 430 on roadway 410, as discussed with respect to FIGS. 4A-4B) and other vehicles traveling within the geofence 440 at the same time. As indicated at the top of FIG. 5A, the target vehicle is traveling east. Because the real-time telematics data shown in table 500 is not filtered by direction, the real-time telematics data includes vehicles traveling in any direction within the geofence 440. However, to calculate an accurate average velocity to determine the average velocity differential for the target vehicle, certain aspects include further filtering the real-time telematics data by direction, such that only real-time telematics data for the plurality of other vehicles traveling in the same direction as the target vehicle is used for calculating the average velocity differential.

In other words, the real-time telematics data for vehicles that are not traveling in the same direction as the target vehicle are not relevant for the calculation of the average velocity. Therefore, table 510 from FIG. 5B may only include vehicle entries for vehicles that are traveling the same direction as the target vehicle (i.e., east), and are thus traveling on the same roadway as the target vehicle. To this end, FIG. 5B depicts a table 510 of real-time telematics data that is filtered by direction, and includes telematics data entries for the target vehicle and the other vehicles traveling within the geofence 440. As shown in table 510, the direction-filtered real-time telematics data may only include entries for other vehicles traveling east, which are also located in the geofence 440. Thus, only the real-time telematics data for vehicles located within geofence 440 and traveling in the same direction as the target vehicle are used to calculate the average velocity, and subsequently, the average velocity differential for the target vehicle compared to these other vehicles.

In one aspect, the velocity data from table 510 for the other vehicles (i.e., not including the target vehicle) that are traveling in the same direction as the target vehicle (i.e., traveling east) may be averaged to determine an average velocity. Based upon the average velocity, an average velocity differential may then be calculated by subtracting this average velocity from the velocity of the target vehicle at the same time (i.e., 5:02 PM). A negative average velocity differential indicates that the target vehicle is going slower than the average velocity of the other vehicles that are traveling within the geofence 440 and in the same direction as the target vehicle.

On the other hand, a positive average velocity differential indicates that the target vehicle is traveling faster than the average velocity of the other vehicles that are traveling within the geofence 440 and in the same direction as the target vehicle. As shown in table 510, the average velocity of the other vehicles (not including the target vehicle) is 34.78 mph and the average velocity differential between the target vehicle and the plurality of other vehicles is −9.78 mph (i.e., the target vehicle is going 9.78 mph slower than the average velocity of the other vehicles).

Exemplary Historical Telematics Data

FIGS. 6A, 6B, and 6C each depict an exemplary table of historical telematics data for a group of vehicles, in accordance with certain aspects of the present technology. FIGS. 6A, 6B, and 6C depict exemplary tables 600, 610, and 620, respectively, of historical telematics data for a target vehicle (e.g., the target vehicle 430 discussed with respect to FIGS. 4A and 4B) and other vehicles that have previously traveled within the geofence 440. Since the telematics data shown in tables 600, 610, and 620 is historical telematics data, the date for each entry varies. However, the telematics data shown in tables 600, 610, and 620 has been filtered initially by day of the week, such that each telematics data entry corresponds to the same day as the target vehicle, such as Thursday with respect to tables 600, 610, and 620.

Additionally, because the telematics data shown in tables 600, 610, and 620 is historical telematics data, the time for each vehicle entry of each table may vary slightly. Thus, the telematics data shown in tables 600, 610, and 620 has also been filtered based upon a threshold time period (i.e., a threshold window of time before and after the time that the target vehicle is traveling on the roadway), such as 5 minutes with respect to tables 600, 610, and 620. Further, for each telematics data entry in tables 600, 610, and 620, weather conditions experienced by each respective vehicle at the time the telematics data was received (or generated) is also indicated.

Similar to the tables 500 and 510, the tables 600, 610, and 620 may also include a unique electronic device ID. In various aspects, the historical telematics data for each vehicle may be collected and stored in a database (such as the database 160 as discussed with respect to FIG. 1 and/or the data storage device 225 as discussed with respect to FIG. 2) and the unique electronic device ID may be used to correlate each particular vehicle to its telematics data. Additionally, in some embodiments, the historical telematics data may be accessed by an electronic device (such as the electronic devices 125, 135, and 145 as discussed with respect to FIG. 1 and/or the electronic device 300 as discussed with respect to FIG. 3) and/or a remote server (such as the server 150 as discussed with respect to FIG. 1 and/or the server 200 as discussed with respect to FIG. 2). Further, each historical telematics data entry has a velocity (in mph) and distance from the target vehicle (in miles).

FIG. 6A depicts a table 600 of historical telematics data for the target vehicle and other vehicles that is filtered by (1) vehicles that have previously traveled within geofence 440, (2) on the same day of the week, and (3) within a 5 minute threshold time period (before and after) the time of the target vehicle. As indicated at the top of FIG. 6A, the target vehicle is traveling north during rain. Because the historical telematics data shown in table 600 is not filtered based upon weather conditions or direction, the historical telematics data in table 600 represents historical telematics data for other vehicles that have previously traveled in any direction and during any weather conditions within the geofence 440.

In various aspects, to calculate an accurate average velocity to determine the average velocity differential for the target vehicle, some aspects may include further filtering the historical telematics data by direction and weather condition. As a result, only historical telematics data for vehicles that have previously traveled on the same roadway, in the same direction, in the same weather conditions, and during the same time period as the target vehicle are used for calculating the average velocity.

FIG. 6B depicts a table 610 of historical telematics data for the target vehicle and the other vehicles traveling within the geofence 440 filtered by direction. Since the historical telematics data listed in tables 600 and 610 indicates that the target vehicle is traveling north, the historical telematics data for the other vehicles, once filtered, only includes vehicles also traveling north. As a result, only the historical telematics data from vehicles that have previously traveled in the same direction as the target vehicle are used to calculate the average velocity, and subsequently, the average velocity differential for the target vehicle compared to these other vehicles. The historical telematics data for the other vehicles that did not previously travel in the same direction as the target vehicle is not relevant for the calculation of the average velocity and is filtered out of table 600 from FIG. 6A. Therefore, table 610 from FIG. 6B only includes vehicle entries for the plurality of other vehicles that have previously traveled in the same direction as the target vehicle (i.e., north).

FIG. 6C depicts another table 620 of historical telematics data for the target vehicle and the other vehicles that have previously traveled north within the geofence 440 filtered by direction and weather. The historical telematics data listed in tables 600, 610, and 620 indicates that the target vehicle is traveling north when it is raining. Aspects include further filtering the telematics data by weather conditions. Therefore, table 620 of FIG. 6C only includes historical telematics data for other vehicles that have (1) previously traveled north at the same time as the target vehicle (i.e., within a threshold time period of +/−5 minutes), and (2) have done so when it was raining. As a result, only the historical telematics data for other vehicles that have previously traveled within the geofence 440, traveled in the same direction as the target vehicle, and experienced the same driving conditions as the target vehicle are used to calculate the average velocity, and subsequently, the average velocity differential for the target vehicle compared to these other vehicles.

Again, a positive and negative average velocity differential indicates that the target vehicle is traveling faster or slower, respectively, than the average velocity of the other vehicles traveling within the geofence 440, during the same time, in the same direction, and during the same weather conditions as the target vehicle. As shown in table 620, the average velocity of the vehicles (not including the target vehicle) is 42.4 mph and the average velocity differential between the target vehicle and the plurality of other vehicles is +12.6 mph (i.e., the target vehicle is going 12.6 mph faster than the average velocity of the other vehicles).

In various aspects, historical telematics data may be accessed when there is no real-time telematics data or there is a limited amount of real-time telematics data that needs to be supplemented with historical telematics data to have a sufficient sample size to perform calculations. For example, there may not be a sufficient sample size of real-time telematics data for a target vehicle traveling on a particular portion of a rural roadway. However, by supplementing any real-time telematics data with historical telematics data from other vehicles that were previously driven on that particular part of the rural roadway, a sufficient sample size of telematics data may be obtained.

Historical telematics data may include telematics data for a plurality of other vehicles that were previously operated by a plurality of drivers within a certain threshold distance of the target vehicle regardless of what roadway the vehicles had previously traveled on. Moreover, in some embodiments, the set of historical telematics data may include data indicative of weather conditions experienced by each of the plurality of other vehicles when the second set of telematics data was generated. Further, the historical telematics data may require filtering in order to narrow down the telematics data to telematics data that represents only vehicles that are traveling on the same roadway, in the same direction, and in a threshold distance and a threshold time period, and in the same weather conditions that the target vehicle is traveling in. The remote server and/or electronic device may perform the function of filtering the historical telematics data.

Figure 7:
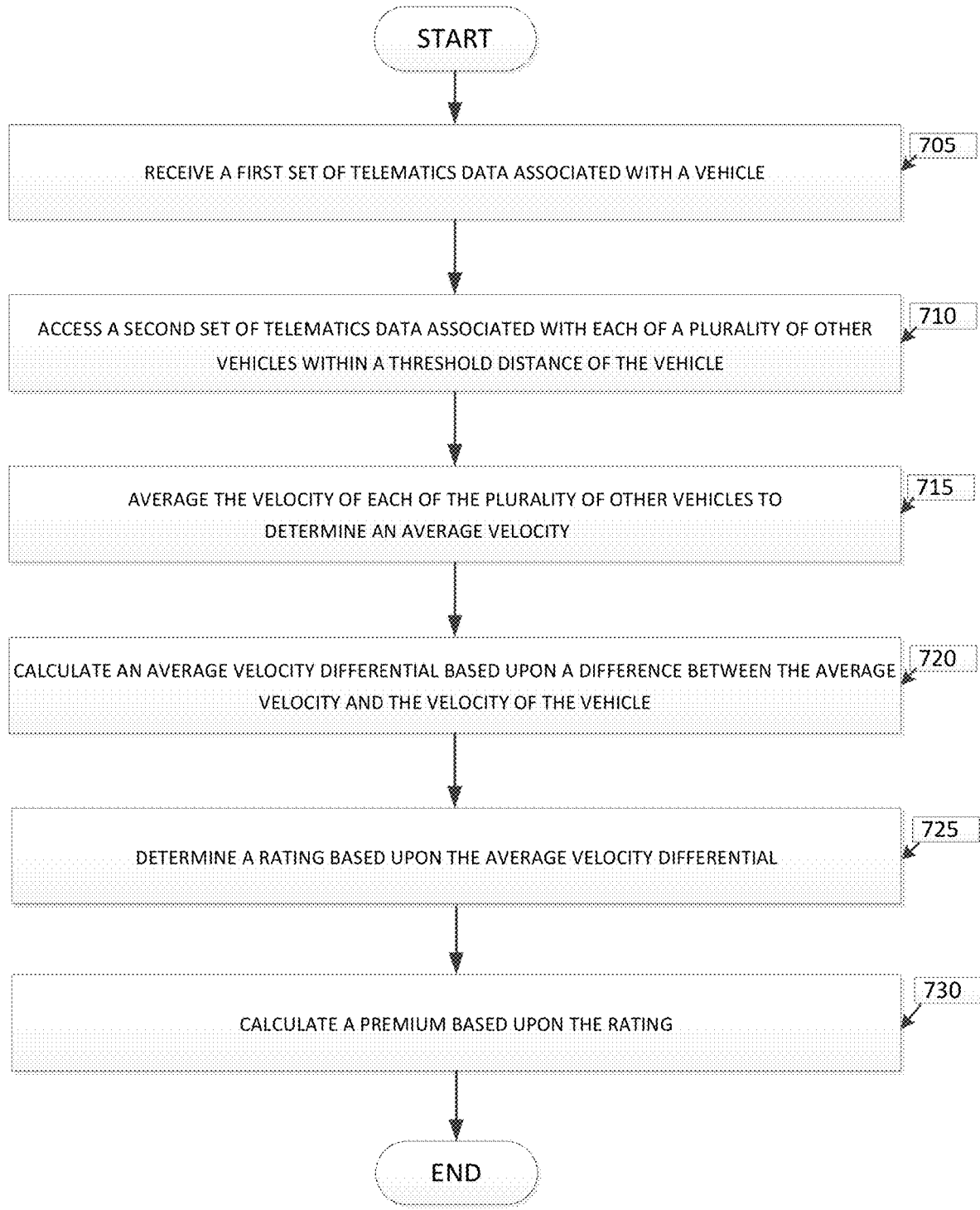
FIG. 7 depicts an exemplary flow diagram associated with assessing an automobile insurance risk rating, in accordance with aspects of the present technology.

Exemplary Computer-Implemented Method for Assessing an Automobile Insurance Risk Rating FIG. 7 depicts an exemplary flow diagram associated with assessing an automobile insurance risk rating, in accordance with certain aspects of the present technology. FIG. 7 illustrates an exemplary computer-implemented method 700 for using a vehicle's relative speed to determine an automobile insurance risk assessment rating for an individual. In various aspects, one or more portions of the method 700 (or the entire method 700) may be facilitated by one or more processors of a suitable device (such as the remote server 150 as discussed with respect to FIG. 1, the remote server 200 as discussed with respect to FIG. 2, the electronic devices 125, 135, and 145 as discussed with respect to FIG. 1, and/or the electronic device 300 as discussed with respect to FIG. 3). The remote server may support execution of a dedicated application that may facilitate the functionalities of the method 700. For example, method 700 may be realized via execution of the automobile insurance RAR application 263 via controller 220 and/or processor 240, as discussed above with reference to FIG. 2.

The method 700 may begin when the one or more processors receive a first set of telematics data associated with a vehicle (such as the target vehicle 430 discussed with respect to FIGS. 4A and 4B) (block 705). In various aspects, the first set of telematics data may include geographic location data indicating a real-time geographic location of the target vehicle. Using this geographic location data (or other sensor data included in the telematics data transmission), a velocity and direction (such as the velocity and direction indicated in the tables 500, 510, 600, 610, and 620 as discussed with respect to FIGS. 5A-5B and 6A-6C) for the target vehicle may be determined.

Additionally, aspects include the one or more processors recording a timestamp representing a time and date (such as the time and date indicated in the tables 500, 510, 600, 610, and 620) associated with when the first set of telematics data was generated and/or received. Further, the telematics data may include data indicative of the weather conditions (such as the weather conditions indicated in the tables 500, 510, 600, 610, and 620) in which the target vehicle is traveling. Additionally or alternatively, the one or more processors may record the current weather conditions associated with the location of the target vehicle when the first set of telematics data was generated and/or received.

Method 700 may include one or more processors accessing a second set of telematics data associated with other vehicles located within a threshold distance of the target vehicle (block 710). The second set of telematics data may indicate a velocity of each of the other vehicles within a time period that is associated with when the first set of telematics data was generated and/or received. In some embodiments, the time period is a threshold window of time (i.e., threshold time period) with respect to the timestamp representing the time and date the first set of telematics data was generated and/or received. In the case of accessing telematics data in real-time, the timestamp may be identical (or nearly identical) to the timestamp for the first set of telematics data, such as those shown in tables 500 and 510, for example.

For any historical telematics data included in the second set of telematics data, the threshold time period may be, for example, a window of time before and after the timestamp associated with the first set of telematics data. For example, the threshold time period shown in FIGS. 6A-6C is +/−5 minutes. Also for example, since the timestamp for the first set of telematics data associated with the target vehicle in tables 600, 610, and 620 of FIGS. 6A-6C is Mar. 23, 2017 at 7:54 AM, the threshold time period for the generation of the second set of telematics data (historical telematics data for FIGS. 6A-6C) is from 7:49 AM to 7:59 AM on the same day, Mar. 23, 2017.

After accessing the second set of telematics data, method 700 may include one or more processors averaging the velocity of each of the other vehicles to determine an average velocity (block 715). Again, in various aspects, the second set of telematics data may include geographic location data indicating a geographic location of each of the other vehicles, which may be used to calculate each vehicle's velocity. The one or more processors may determine the direction and velocity of a vehicle based upon the change in each vehicle's geographic location over time. By determining the direction of the other vehicles, the second set of telematics may be filtered by direction (such as the filtered telematics data in tables 510 and 610 as discussed with respect to FIGS. 5B and 6B, respectively), thereby eliminating irrelevant telematics data from the calculation of average velocity. After the second set of telematics data is filtered, method 700 may include one or more processors calculating the average velocity of the filtered telematics data (block 715).

After the average velocity of the vehicles from the completely filtered second set of telematics data have been calculated, method 700 may include one or more processors calculating an average velocity differential based upon the difference between the average velocity (block 715) and the velocity of the target vehicle (block 720).

Based upon the calculated average velocity differential (block 720), method 700 may include one or more processors determining an automobile insurance risk assessment rating (block 725). In various aspects, the one or more processors may calculate the automobile insurance risk assessment rating by compensating for weather conditions and road conditions, because driving behavior may be affected by such conditions. For example, the automobile insurance risk assessment rating may represent a numeric score that reflects higher risks with increasing numeric values.

The automobile insurance risk assessment rating is an indication of how safe (or unsafe) an individual's driving behavior is when operating a vehicle. The safer an individual's driving behavior is when operating a vehicle, the lower the individual's automobile insurance risk assessment rating will be. As one example, the automobile insurance risk assessment rating may be a numerical value between 0 and 100. For example, an individual with an automobile insurance risk assessment rating of 0 may exhibit very safe driving behavior, an individual with an automobile insurance risk assessment rating of 50 may exhibit average driving behavior, and an individual with an automobile insurance risk assessment rating of 100 may exhibit very unsafe driving behavior.

In various aspects, an insured individual may begin an automobile insurance policy with a default automobile insurance risk assessment rating of 50. Based upon the insured individual's subsequent driving behavior, the insured individual's automobile insurance risk assessment rating may increase or decrease. For example, if the insured individual's relative speed (i.e., average velocity differential) is within a certain threshold range (e.g., a threshold mph range or a threshold percentage range) of the average velocity of the other vehicles in the vicinity, the insured individual may be exhibiting safer than average driving behavior, thereby decreasing the insured individual's automobile risk assessment rating. Thus, if the insured individual's automobile insurance risk assessment rating is 50 and the relative speed of the insured individual's vehicle is 3 mph faster than the average velocity of the other vehicle in the vicinity, and the threshold mph range is ±5 mph of the average velocity of the other vehicles in the vicinity, then the insured individual may be exhibiting safer than average driving behavior. As a result, the insured individual's automobile insurance risk assessment rating may decrease from 50 to 40.

For another example, if the relative speed of the vehicle of the insured individual just mentioned in the previous paragraph is above the threshold range of the average velocity of the other vehicles in the vicinity, the insured individual may be exhibiting driving behavior that is unsafe or riskier when compared to average driving behavior. Therefore, the insured individual's automobile insurance risk assessment rating may increase. Thus, if the insured individual's automobile insurance risk assessment rating is 50 and the relative speed of the insured individual's vehicle is 12 mph higher than the average velocity of the other vehicles in the vicinity (with the threshold mph range being ±5 mph), then the insured individual may be exhibiting driving behavior that is unsafe and the insured individual's automobile insurance risk assessment rating may increase from 50 to 70. The insured individual's automobile insurance risk assessment rating may increase by 20 points because the relative speed of the vehicle that the insured individual is driving is over 10 mph than the average speed of the other vehicles in the vicinity, and has repeatedly demonstrated this driving behavior, as further discussed below.

In other aspects, other conditions may also affect an individual's automobile risk assessment rating. Conditions such as weather, road conditions, construction, etc., may adversely affect an individual's driving behavior, and thus, may have an impact on an individual's automobile risk assessment rating. For example, the historical telematics data 600, 610, and 620 from FIGS. 6A-6C indicate that the individual is driving the target vehicle when it is raining. Additionally, the historical telematics data 620 indicates that the relative speed of the target vehicle is 12.6 mph faster than the average velocity of the other vehicles in the vicinity. If the threshold mph range is ±5 mph, not only is the individual traveling over twice as fast as the average velocity of the other vehicles in the vicinity, but the individual is doing so while it is raining. Therefore, if the individual initially had an automobile insurance risk assessment rating of 50, it may now increase by 20 points because individual driving at a very high relative speed and another 10 points because the individual is doing so in the rain. As a result, the individual's automobile insurance risk assessment rating may increase from 50 to 80.

In various aspects, method 700 may include one or more processors calculating an automobile insurance premium based upon the calculated automobile insurance risk assessment rating (block 730). In various aspects, the insured individual's automobile insurance risk assessment rating and the resulting adjustments to the insured individual's premium as a result of this rating may be related by any suitable proportionality, function, of dependency. For example, the automobile insurance risk assessment rating and the corresponding automobile insurance premium may be directly proportional. In other words, a higher automobile insurance risk assessment rating generates a higher automobile insurance premium, and conversely, a lower automobile insurance risk assessment rating generates a lower automobile insurance premium.

As mentioned above, an insured individual may begin an automobile insurance policy with a default automobile insurance risk assessment rating of 50. Because of this, the insured individual's automobile insurance premium may also default to a certain amount, for example $300. In various aspects, a change in the insured individual's automobile risk assessment rating may result in a percentage change of the insured individual's automobile insurance premium. For example, for every 10 points increase or decrease of an insured individual's automobile insurance risk assessment rating, the insured individual's automobile insurance premium may respectively increase or decrease by 10%. Therefore, if an insured individual's automobile insurance risk assessment rating decreases from 50 to 30, the insured individual's automobile insurance premium may decrease by 20% to $240. On the other hand, if an insured individual's automobile insurance risk assessment rating increases from 50 to 80, the insured individual's automobile premium may increase by 30% to $390.

For example, the target vehicle associated with the real-time telematics data of tables 500 and 510 from FIGS. 5A and 5B, respectively, indicates that the target vehicle's relative speed is 9.78 mph slower (i.e., the average velocity differential is −9.78 mph) than the average velocity of the other vehicles in the vicinity. In this case, the target vehicle may actually be creating dangerous conditions on the roadway because it is going so much slower than the average speed of the vehicles surrounding it (i.e., the target vehicle is going much slower than the speed of traffic). Other vehicles may have to slam on their brakes when approaching the target vehicle and/or they may switch lanes to go around the vehicle. This type of behavior may create dangerous driving conditions in the vicinity of the target vehicle, which may increase the likelihood of an accident or condition that may result in property damage, injury, and death. Therefore, the automobile insurance assessment rating of the individual operating the target vehicle may increase because of the driving behavior exhibited by the individual while operating the target vehicle. Further, the driver's automobile insurance premium may increase as a result of this increase to the automobile insurance assessment rating.

As another example, the target vehicle associated with the historical telematics data of tables 600, 610, and 620 from FIGS. 6A-6C, respectively, indicates that the target vehicle's relative speed is 12.6 mph faster (i.e., the average velocity differential is +12.6 mph) than the average velocity of the other vehicles. In this case, the target vehicle is going much faster than the average speed of the other vehicles proximate to the target vehicle (i.e., the target vehicle is going much faster than the speed of traffic). As a result, the driver of the target vehicle may be creating dangerous road conditions on the roadway because it may be changing lanes frequently, cutting other vehicles off, etc., to achieve this. Additionally, it is raining while the target vehicle is on the roadway, and therefore there may be reduced visibility, a slippery roadway, etc. in addition to the higher-than-average speed of the target vehicle, creating an even greater risk. Therefore, the automobile insurance assessment rating of the individual operating the target vehicle may also increase because of the driving behavior exhibited by the individual while operating the target vehicle. Again, the individual's automobile insurance premium may increase as a result of this increase to the individual's automobile insurance assessment rating.

To prevent an automobile insurance risk assessment rating from increasing, and consequently preventing the associated automobile insurance premium from increasing, it is preferable that a target vehicle be operated close to the average calculated velocity of the various other vehicles (either in real-time or historically) as discussed herein with reference to tables 500, 510, 600, 610, and 620. Additionally, if an individual's automobile insurance risk assessment rating is high to begin with, it may be decreased by continuously operating the target vehicle closer to the calculated average velocity of the other vehicles (either in real-time or historically) over time. As the individual's automobile insurance risk assessment rating is decreased, the individual's automobile insurance premium may likewise decrease.

In various aspects, an individual's automobile insurance risk assessment rating may increase or decrease based upon an analysis of the calculated average velocity differential over time. In other words, the velocity differential discussed herein may be based upon several different instances for the purposes of assessing the driver's risk. For example, if a target vehicle's calculated average velocity differential at various times is greater than a certain threshold velocity for more than a threshold number of days within a month, a threshold number of consecutive days, a threshold number of times throughout a single day, etc., then the individual's automobile insurance risk assessment rating may increase accordingly. Furthermore, the opposite may be true when the target vehicle's calculated average velocity differential at various different times is within a threshold velocity window of the other vehicle's calculated average velocity for a threshold number of days within a month, a threshold number of consecutive days, a threshold number of times throughout a single day, etc.

Thus, in various aspects, the electronic device that determines the individual's automobile insurance risk assessment rating (e.g., remote server 200) may transmit this information and/or an automobile insurance premium to an electronic device associated with the target vehicle operator (e.g., the electronic device 125, 135, and/or 145 with respect to FIG. 1 and/or the electronic device 300 with respect to FIG. 3) who is an insured driver.

Further, in various aspects, upon receiving information via the transmission as noted directly above, the electronic device may provide a set of recommendations to allow the insured driver to improve her automobile insurance risk assessment rating, thus lowering her automobile insurance premium. For example, the set of recommendations may be included as part of the information related to the individual's automobile insurance risk assessment rating and automobile insurance premium that was transmitted from the remote server to the electronic device. The user interface of the electronic device may then display this information and/or one or more links to access this information for the insured driver to review. The set of recommendations may include, for example, tips for driving in adverse weather conditions, specific locations where bad driving behavior was exhibited by the individual, recommendations to mitigate identified driving behaviors that are excessively high risk, etc. Additional details regarding the notification and other information that may be presented to an insured driver via her electronic device are further discussed below.

Figure 8:
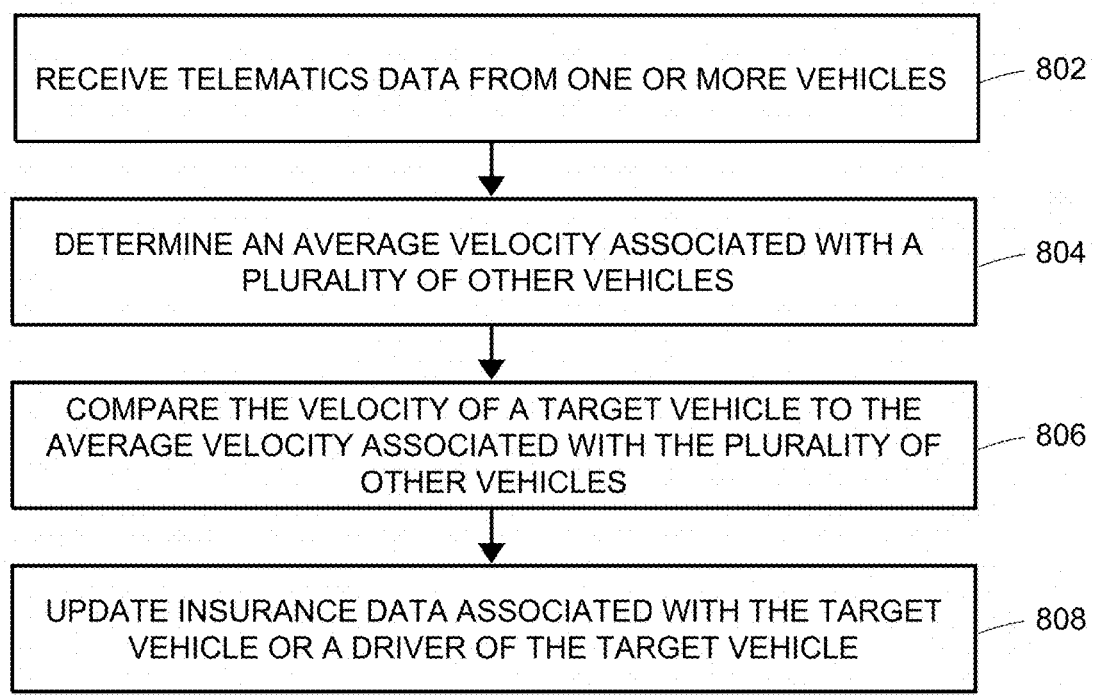
FIG. 8 depicts an exemplary flow diagram associated with assessing an automobile insurance risk rating, in accordance with aspects of the present technology.

Exemplary Computer-Implemented Method for Assessing an Automobile Insurance Risk Rating and Updating Insurance Data FIG. 8 depicts an exemplary flow diagram associated with assessing an automobile insurance risk rating, in accordance with aspects of the present technology. FIG. 8 illustrates an exemplary computer-implemented method 800 for updating insurance data associated with a target vehicle using telematics data. In various aspects, one or more portions of the method 800 (or the entire method 800) may be facilitated by one or more processors of a suitable device (such as the remote server 150 as discussed with respect to FIG. 1, the remote server 200 as discussed with respect to FIG. 2, the electronic devices 125, 135, and 145 as discussed with respect to FIG. 1, and/or the electronic device 300 as discussed with respect to FIG. 3). The remote server may support execution of a dedicated application that may facilitate the functionalities of the method 800. For example, method 800 may be realized via execution of the automobile insurance RAR application 263 via controller 220 and/or processor 240, as discussed above with reference to FIG. 2.

The method 800 may begin when the one or more processors receive telematics data associated from one or more vehicles (such as the target vehicle 430 and other nearby vehicles as discussed with respect to FIGS. 4A and 4B) (block 802). Again, in various aspects, the telematics data may include any suitable type of data used to calculate an average velocity differential, among other information (block 802). Moreover, the telematics data may originate and/or be generated by different types of components or devices, such as vehicles, smart infrastructure components, dashboard plug-in devices, and/or mobile devices or electronic devices, as discussed above with reference to FIG. 1. For example, the telematics data may be transmitted continuously or periodically and include geographic location data indicating a real-time geographic location of the target vehicle. Additionally, the telematics data may indicate the geographic location of other nearby vehicles (in real-time or based upon stored historical telematics data) and/or sensor metrics used to identify each vehicle's acceleration, braking, cornering, velocity, heading, route, etc. (block 802).

The method 800 may include one or more processors determining an average velocity associated with a plurality of other vehicles (block 804). Again, these other vehicles may correspond to other vehicles proximate to a target vehicle (in real-time or based upon historical telematics data), that satisfy various conditions such that each of the other vehicles is experiencing similar driving conditions as the target vehicle. These conditions may include, for example, distance, time of day and/or week, weather conditions, direction, etc.

Method 800 may include one or more processors determining the average velocity of the other vehicles in any suitable manner based upon the type of telematics data available (block 804). For example, method 800 may include one or more processors using changes in geographic location data over time (or other sensor data included in the telematics data transmission) to identify a velocity and direction of each of the other vehicles at various times (such as the velocity and direction indicated in the tables 500, 510, 600, 610, and 620 as discussed with respect to FIGS. 5A-5B and 6A-6C). As examples, the velocity of other vehicles in the vicinity of, or traveling in the same direction and along the same area of road as, a target vehicle may be determined from (1) one or more sensors or processors mounted on the target vehicle itself, (2) one or more sensors or processors mounted on the other vehicles (which may be smart or interconnected vehicles capable of wireless communication, and configured to transmit speed, heading or direction, route, and/or location information), and/or (3) one or more sensors or processors mounted on, or associated with, smart infrastructure (such as smart road signs, smart mile markers, or smart toll booths). Once a velocity is determined for each of the other vehicles, method 800 may include averaging these velocities together to calculate an average velocity associated with the other vehicles (block 804).

The method 800 may include one or more processors comparing the velocity of a target vehicle to the average velocity (block 804) associated with the other vehicles (block 806). In some aspects, this may include comparing a real-time velocity of the target vehicle to the real-time average velocity associated with the other vehicles, as discussed directly above (block 806). In other aspects, this may include comparing a real-time or historical velocity of the target vehicle to the historical average velocity associated with the other vehicles, as discussed directly above (block 806). In any event, the result of this comparison may yield an average velocity differential between the target vehicle and the other vehicles (block 806). This average velocity differential may be, for example, similar to the average velocity differential shown in FIGS. 5B and 6C, as discussed herein (block 806).

The method 800 may include one or more processors updating insurance data associated with the target vehicle or a driver of the target vehicle (block 808). This may include, for example, calculating a risk assessment rating for an insured driver associated with the target vehicle, and updating various insurance-related information for the insured driver based upon this and/or other calculations (block 808).

For example, method 800 may include periodically updating information on file for an insured driver based upon changes to her risk assessment rating (block 808). This may also include, for example updating other information that is affected by the risk assessment rating (block 808). Some examples of other information that may be affected in this way may include insurance premium pricing, qualifying (or no longer qualifying) for "safe driver" or other applicable discounts, terminating insurance coverage, etc. (block 808). In various aspects, one or more portions of method 800 (or the entire method 800) may be repeated (blocks 802, 804, 806, and/or 808) continuously or periodically such that the insurance data is updated over time. In other words, a user's risk assessment rating may be updated over time based upon the driver's tracked velocity compared to other similarly-situated drivers, such that transient or one-time measurements of excessive velocity do not result in the driver's insurance information being unnecessarily updated. The method may include additional, less, or alternate actions, including those discussed elsewhere herein.

Exemplary User Interface

Figure 9:
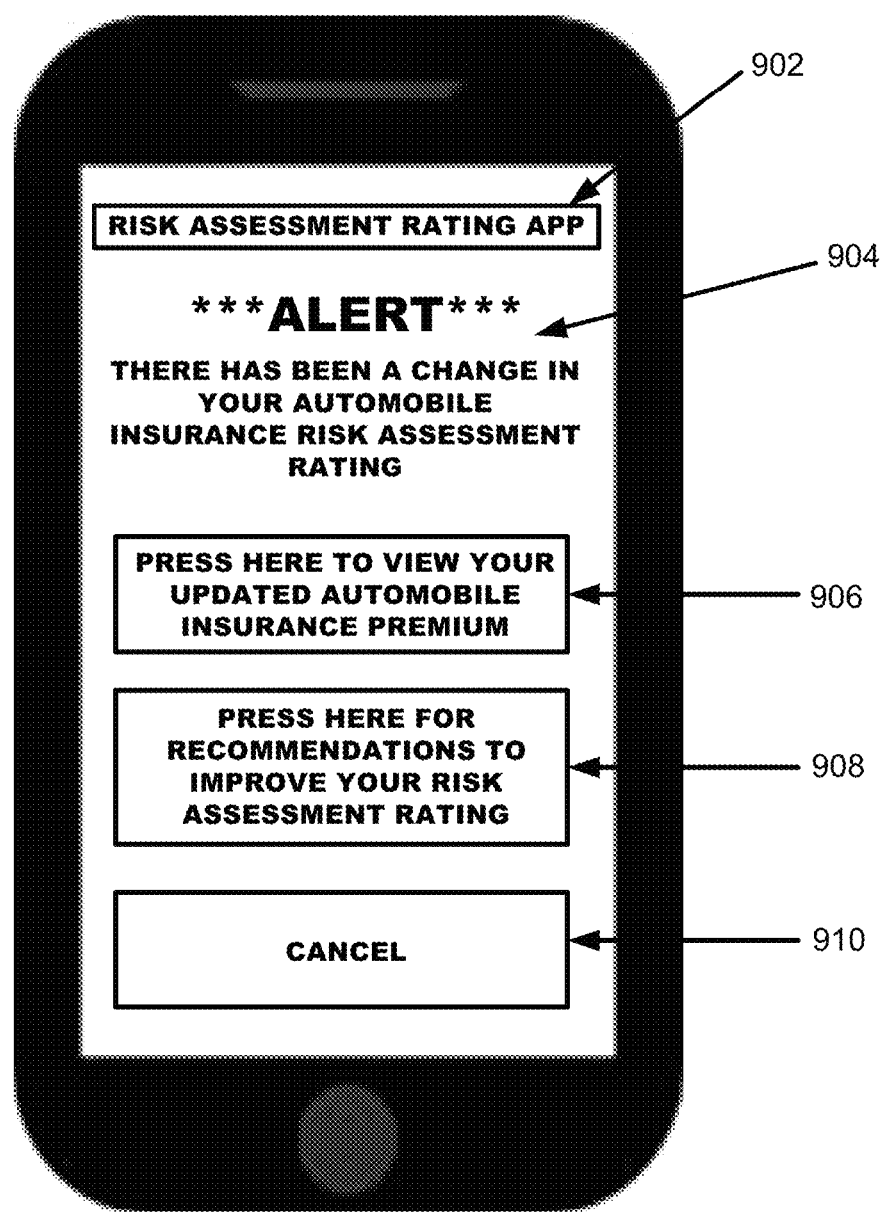
FIG. 9 depicts an exemplary user interface associated with displaying automobile insurance risk assessment information, in accordance with aspects of the present technology.

FIG. 9 depicts an exemplary user interface associated with displaying automobile insurance risk assessment information, in accordance with aspects of the present technology. FIG. 9 illustrates a display interface 900 of an electronic device (such as the electronic device 125, 135, and/or 145 with respect to FIG. 1 and/or the electronic device 300 with respect to FIG. 3) for an automobile insurance risk assessment rating (RAR) application (e.g., automobile insurance RAR application 263). It is to be understood that the information discussed herein may be conveyed in any suitable manner, and that the display interface 900 shown in FIG. 9 is but one example.

As shown in FIG. 9, display interface 900 may include an information box 902 that identifies the application and additional information 904 that alerts the user that there has been a change in the user's automobile insurance risk assessment rating. The display interface 900 may also include an interactive portion 906, which indicates to "PRESS HERE TO VIEW YOUR UPDATED AUTOMOBILE INSURANCE PREMIUM," thereby enabling a user to view his/her updated automobile insurance risk assessment rating and updated automobile insurance premium.

Additionally, the display interface 900 may include an interactive portion 908, which indicates to "PRESS HERE FOR RECOMMENDATIONS TO IMPROVE YOUR RISK ASSESSMENT RATING," thereby enabling a user to review recommendations to improve his/her automobile insurance risk assessment rating, thus decreasing his/her automobile insurance premium. Further, the display interface 900 may include an interactive portion 910, which indicates "CANCEL," thereby enabling a user to exit the application, to return to a prior screen, to exit to the home screen, etc.

Exemplary Computer-Implemented Method for an Automobile Insurance Risk Assessment Rating In one aspect, a computer-implemented method for an automobile insurance risk assessment rating may be provided. The method may include one or more processors (1) receiving a first set of telematics data associated with a vehicle operated by an individual and indicating a velocity of the vehicle; (2) accessing a second set of telematics data associated with each of a plurality of other vehicles within a threshold distance of the vehicle, the second set of telematics data indicating a velocity of each of the plurality of other vehicles within a time period associated with when the first set of telematics data was generated; (3) averaging the velocity of each of the plurality of other vehicles to determine an average velocity; (4) calculating average velocity differential based upon a difference between the average velocity and the velocity of the vehicle; and/or (5) determining a rating based upon the average velocity differential. The method may include additional, less, or alternate actions, including those discussed elsewhere herein.

For instance, in various aspects, the method may include recording a timestamp representing a time and date associated with when the first set of telematics data was generated, wherein the time period associated with when the second set of telematics data was generated is a threshold window of time with respect to the timestamp. Additionally, the second set of telematics data may include at least one of: (i) a set of historical telematics data, and (ii) a set of real-time telematics data.

The set of historical telematics data may include data indicative of weather conditions experienced by each of the plurality of other vehicles when the second set of telematics data was generated and the act of determining the rating may include compensating for the weather conditions.

Additionally or alternatively, the first set of telematics data may include global navigation satellite system (GNSS) data indicating a real-time geographic location of the vehicle, wherein the set of real-time telematics data includes GNSS data indicating a real-time location of each of the plurality of other vehicles. The method may also comprise determining whether each of the plurality of other vehicles are within the threshold distance of the location of the vehicle by comparing the real-time geographic location of the first vehicle to the real-time location of each of the plurality of other vehicles.

Furthermore, the second set of telematics data may include global navigation satellite system (GNSS) data indicating a geographic location of each of the plurality of other vehicles and the act of averaging the velocity of each of the plurality of other vehicles may include averaging the velocity of each of the plurality of other vehicles using the GNSS data.

Additionally or alternatively, the method may include (1) calculating an insurance premium based upon the rating; (2) transmitting the insurance premium to an electronic device for presentation to the individual; and (3) providing, via the electronic device, a set of recommendations to improve the rating for the individual and to lower the insurance premium.

Exemplary Remote Server for an Automobile Insurance Risk Assessment Rating

In another aspect, a remote server for an automobile insurance risk assessment rating may be provided. The remote server may include (1) a communication unit configured to receive a first set of telematics data associated with a vehicle operated by an individual and indicating a velocity of the vehicle; and (2) a processor unit configured to: (a) access a second set of telematics data associated with each of a plurality of other vehicles within a threshold distance of a location of the vehicle, the second set of telematics data indicating a velocity of each of the plurality of other vehicles within a time period associated with when the first set of telematics data was generated; (b) average the velocity of each of the plurality of other vehicles to determine an average velocity; (c) calculate an average velocity differential based upon a difference between the average velocity and the velocity of the vehicle; and/or (d) determine a rating based upon the average velocity differential. The remote server may include additional, less, or alternate functionality, including that discussed elsewhere herein.

For instance, in various aspects, the processor unit may be configured to record a timestamp representing a time and date associated with when the first set of telematics data was generated. Additionally, the time period associated with when the second set of telematics data was generated is a threshold window of time with respect to the timestamp. Further, the second set of telematics data may include at least one of: (i) a set of historical telematics data, and (ii) a set of real-time telematics data.

The set of historical telematics data may include data indicative of weather conditions experienced by each of the plurality of other vehicles when the second set of telematics data was generated and the processor unit may further be configured to determine the rating by compensating for the weather conditions.

Additionally or alternatively, the first set of telematics data may include global navigation satellite system (GNSS) data indicating a real-time geographic location of the vehicle and the set of real-time telematics data includes GNSS data indicating a real-time location of each of the plurality of other vehicles. The processor unit may also further be configured to determine whether each of the plurality of other vehicles are within the threshold distance of the location of the vehicle by comparing the real-time geographic location of the first vehicle to the real-time location of each of the plurality of other vehicles.

Furthermore, the second set of telematics data may include global navigation satellite system (GNSS) data indicating a geographic location of each of the plurality of other vehicles and the act of averaging the velocity of each of the plurality of other vehicles may include averaging the velocity of each of the plurality of other vehicles using the GNSS data.

Additionally or alternatively, the processor may be further configured to: (1) calculate an insurance premium based upon the rating; (2) transmit the insurance premium to an electronic device for presentation to the individual; and (3) provide a set of recommendations to improve the rating for the individual and to lower the insurance premium.

Exemplary Non-Transitory Computer-Readable Medium for an Automobile Insurance Risk Assessment Rating In yet another aspect, a tangible, non-transitory computer-readable medium for an automobile insurance risk assessment rating may be provided. The tangible, non-transitory computer-readable medium (or media) may include instructions executable by one or more processors that, when executed by the one or more processors, cause the one or more processors to (1) receive a first set of telematics data associated with a vehicle operated by an individual and indicating a velocity of the vehicle; (2) access a second set of telematics data associated with each of a plurality of other vehicles within a threshold distance of a location of the vehicle, the second set of telematics data indicating a velocity of each of the plurality of other vehicles within a time period associated with when the first set of telematics data was generated; (3) average the velocity of each of the plurality of other vehicles to determine an average velocity; (4) calculate an average velocity differential based upon a difference between the average velocity and the velocity of the vehicle; and/or (5) determine a rating based upon the average velocity differential. The instructions may direct additional, less, or alternate functionality, including that discussed elsewhere herein.

For instance, in various aspects, the instructions, when executed by one or more processors, may further cause the one or more processors to record a timestamp representing a time and date associated with when the first set of telematics data was generated, the time period being associated with when the second set of telematics data was generated is a threshold window of time with respect to the timestamp.

Additionally or alternatively, the second set of telematics data may include at least one of: (i) a set of historical telematics data, and (ii) a set of real-time telematics data, the first set of telematics data includes global navigation satellite system (GNSS) data indicating a real-time geographic location of the vehicle, and the set of real-time telematics data includes GNSS data indicating a real-time location of each of the plurality of other vehicles, wherein the instructions, when executed by one or more processors, further cause the one or more processors to determine whether each of the plurality of other vehicles are within the threshold distance of the location of the vehicle by comparing the real-time geographic location of the first vehicle to the real-time location of each of the plurality of other vehicles.

Furthermore, the set of historical telematics data may include data indicative of weather conditions experienced by each of the plurality of other vehicles when the second set of telematics data was generated, and wherein the instructions, when executed by one or more processors, further cause the one or more processors to determine the rating by compensating for the weather conditions.

Additionally or alternatively, the second set of telematics data may include global navigation satellite system (GNSS) data indicating a geographic location of each of the plurality of other vehicles and wherein the instructions, when executed by one or more processors, further cause the one or more processors to average the velocity of each of the plurality of other vehicles using the GNSS data.

Furthermore, the instructions, when executed by one or more processors, may further cause the one or more processors to: (1) calculate an insurance premium based upon the rating; (2) transmit the insurance premium to an electronic device for presentation to the individual; and/or (3) provide a set of recommendations to improve the rating for the individual and to lower the insurance premium.

Additional Embodiments

In one aspect, a computer-implemented method for determining vehicle speed differential from average traffic speed at a particular location or in a given area may be provided. The method may include (1) receiving, using one or more processors and/or associated transceivers (such as via wireless communication or data transmission over one or more radio links), a set of telematics data associated with a vehicle operated by an individual and indicating a velocity and location (or area/vicinity) of the vehicle; (2) receiving or determining, using the one or more processors, an average speed of traffic at or in the vicinity (e.g., 1, 2, or 5 miles) of the location of the vehicle; (3) calculating, using the one or more processors, a velocity differential based upon a difference between the average speed of traffic and the velocity of the vehicle; and/or (4) determining, using the one or more processors, a rating based upon the average velocity differential to facilitate matching premium to risk, or lack thereof. The method may include additional, less, or alternate actions, including those discussed elsewhere herein.

In another aspect, a computer system configured to determine speed differentials between flow of traffic and a particular vehicle may be provided. The system may include one or more processors, sensors, transceivers, and servers configured to: (1) receive (such as via wireless communication or data transmission over one or more radio links) a set of telematics data associated with a vehicle operated by an individual and indicating a velocity and location (or area/vicinity) of the vehicle; (2) receive (such as via wireless communication or data transmission over one or more radio links) or otherwise determine an average speed of traffic at or in the vicinity (e.g., 1, 2, or 5 miles) of the location of the vehicle; (3) calculate a velocity differential based upon a difference between the average speed of traffic and the velocity of the vehicle; and/or (4) determine a rating for the vehicle based upon the average velocity differential. The system may be configured to include additional, less, or alternate functionality, including that discussed elsewhere herein.

In another aspect, a computer-implemented method for determining speed differential between the flow of traffic along a route and a particular vehicle may be provided. The method may include (1) receiving, using one or more processors and/or associated transceivers, data detailing average traffic speed and direction of traffic flow at a given location or an area (such as via wireless communication or data transmission over one or more radio links), the data being transmitted by one or more smart or other vehicles, one or more mobile devices traveling within vehicles, and/or one or more smart infrastructure sensors; (2) receiving, using the one or more processors and/or associated transceivers (such as via wireless communication or data transmission over one or more radio links), a set of telematics data associated with a vehicle operated by an individual and indicating (i) a velocity, (ii) a direction of travel, and (iii) a location (or area/vicinity) of the vehicle, the location or area of the vehicle matching the location or area associated with the average traffic speed, and the direction of travel of the vehicle (as determined from the telematics data) matching the direction of traffic flow associated with the average traffic speed; (3) calculating, using the one or more processors, a velocity differential based upon a difference between the average traffic speed and the velocity of the vehicle; and/or (4) determining, using the one or more processors, a rating based upon the average velocity differential to facilitate matching risk, or lack thereof, to premium appropriately. The method may include additional, less, or alternate actions, including those discussed elsewhere herein.

In another aspect, a computer system configured to compare vehicle velocity with average traffic speed of traffic in the vicinity may be provided. The system may include one or more processors, sensors, transceivers, and/or servers configured to: (1) receive data detailing average traffic speed and direction of traffic flow at a given location or an area (such as via wireless communication or data transmission over one or more radio links), the data being transmitted by one or more smart or other vehicles, one or more mobile devices traveling within vehicles, and/or one or more smart infrastructure sensors; (2) receive (such as via wireless communication or data transmission over one or more radio links) a set of telematics data associated with a vehicle operated by an individual and indicating (i) a velocity, (ii) a direction of travel, and (iii) a location (or area/vicinity) of the vehicle, the location or area of the vehicle matching the location or area associated with the average traffic speed, and the direction of travel of the vehicle (as determined from the telematics data) matching the direction of traffic flow associated with the average traffic speed; (3) calculate a velocity differential based upon a difference between the average traffic speed and the velocity of the vehicle; and/or (4) determine a rating based upon the average velocity differential to facilitate matching risk, or lack thereof, to premium appropriately. The system may include additional, less, or alternate functionality, including that discussed elsewhere herein.

In an additional aspect, a computer-implemented method is provided. The method may include (1) receiving, using one or more processors, telematics data associated with one or more vehicles, the one or more vehicles including a target vehicle; (2) determining, using the one or more processors, an average velocity of the other vehicles excluding the target vehicle; (3) comparing, using the one or more processors, a velocity of the target vehicle to the average velocity of the other vehicles; and/or (4) updating, using the one or more processors, insurance data associated with the target vehicle or a driver associated with the target vehicle based upon the comparison of the velocity of the target vehicle to the average velocity of the other vehicles. The method may include additional, less, or alternate actions, including those discussed elsewhere herein.

In yet another aspect, a remote server is provided. The remote server may include (1) a communication unit configured to receive telematics data associated with one or more vehicles, the one or more vehicles including a target vehicle; and (2) a processor unit configured to: (i) determine an average velocity of the other vehicles excluding the target vehicle; (ii) compare, a velocity of the target vehicle to the average velocity of the other vehicles; and (iii) update insurance data associated with the target vehicle or a driver associated with the target vehicle based upon the comparison of the velocity of the target vehicle to the average velocity of the other vehicles. The remote server may include additional, less, or alternate components, including those discussed elsewhere herein.

In still another aspect, a tangible, non-transitory computer-readable medium may be provided. The tangible, non-transitory computer-readable medium may include instructions executable by one or more processors that, when executed by the one or more processors, cause the one or more processors to (i) receive telematics data associated with one or more vehicles, the one or more vehicles including a target vehicle; (ii) determine an average velocity of the other vehicles excluding the target vehicle; (iii) compare a velocity of the target vehicle to the average velocity of the other vehicles; and (iv) update insurance data associated with the target vehicle or a driver associated with the target vehicle based upon the comparison of the velocity of the target vehicle to the average velocity of the other vehicles. The non-transitory computer-readable medium may include additional, less, or alternate instructions, including those discussed elsewhere herein.

Additional Considerations

As used herein, the term "vehicle" is used interchangeably with "automobile" and the term "automobile" refers to any type of powered transportation device, which includes, but is not limited to, a car, truck, bus, motorcycle, or boat—including fully or partially self-driving (i.e., autonomous or semi-autonomous) vehicles. While a vehicle may be described herein as being controlled by an operator or insured individual, the aspects described herein also apply to autonomous vehicles that may be unmanned and/or operated remotely or in another suitable fashion, such as via controls other than the steering wheel, gear shift, brake pedal, and accelerator pedal.

The systems and methods described herein are directed to an improvement to computer functionality, and improve the functioning of conventional computers.

With the foregoing, an insurance customer may opt-in to a rewards, insurance discount, or other type of program. After the insurance customer provides their affirmative consent, an insurance provider remote server may collect data from the customer's mobile device, on-board vehicle computer, or other devices—such as with the customer's permission or affirmative consent. The data collected may be related to vehicle functionality (or vehicle occupant preferences or preference profiles) or vehicle operation, and/or insured assets before (and/or after) an insurance-related event, including those events discussed elsewhere herein. In return, risk averse insureds, vehicle owners, or vehicle occupants may receive discounts or insurance cost savings related to auto insurance, as well as home, renters, personal articles, and other types of insurance from the insurance provider.

In one aspect, smart or interconnected vehicle data, and/or other data, including the types of data discussed elsewhere herein, may be collected or received by an insurance provider remote server, such as via direct or indirect wireless communication or data transmission from an on-board vehicle computer, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) vehicle, home, or apartment occupants.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some exemplary embodiments, the one or more processors or processor-implemented modules may be located in a single geographic location (e.g., within a vehicle, within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method, comprising:
   receiving, by one or more processors, a first set of telematics data associated with a vehicle being operated at a location, the first set of telematics data indicating a velocity of the vehicle;
   accessing, by the one or more processors, a second set of telematics data associated with each of a plurality of other vehicles being operated within a threshold distance of the location of the vehicle, the second set of telematics data indicating a velocity of each of the plurality of other vehicles within a time period associated with when the first set of telematics data was generated;
   averaging, by the one or more processors, the velocity of each of the plurality of other vehicles to determine an average velocity;
   calculating, by the one or more processors, an average velocity differential based upon a difference between the average velocity and the velocity of the vehicle; and
   determining, by the one or more processors, a rating based upon the average velocity differential.

2. The computer-implemented method of claim 1, further comprising recording, by the one or more processors, a timestamp representing a time and date associated with when the first set of telematics data was generated, wherein the time period associated with when the first set of telematics data was generated is a threshold window of time with respect to the timestamp.

3. The computer-implemented method of claim 1, wherein the second set of telematics data includes at least one of: (i) a set of historical telematics data, and (ii) a set of real-time telematics data.

4. The computer-implemented method of claim 3, wherein:
   the set of historical telematics data includes data indicative of weather conditions experienced by each of the plurality of other vehicles when the second set of telematics data was generated; and
   determining the rating further includes compensating for the weather conditions.

5. The computer-implemented method of claim 3, wherein the first set of telematics data includes global navigation satellite system (GNSS) data indicating a real-time geographic location of the vehicle and the set of real-time telematics data includes GNSS data indicating a real-time location of each of the plurality of other vehicles, and the method further comprises determining, by the one or more processors, whether each of the plurality of other vehicles are within the threshold distance of the location of the vehicle by comparing the real-time geographic location of the vehicle to the real-time location of each of the plurality of other vehicles.

6. The computer-implemented method of claim 1, wherein:
   the second set of telematics data includes global navigation satellite system (GNSS) data indicating a geographic location of each of the plurality of other vehicles; and
   averaging the velocity of each of the plurality of other vehicles further includes averaging the velocity of each of the plurality of other vehicles by using the GNSS data.

7. The computer-implemented method of claim 1, further comprising:
   calculating, by the one or more processors, an insurance premium based upon the rating;
   transmitting, by the one or more processors, the insurance premium to an electronic device for presentation to an individual associated with the vehicle; and
   providing, via the electronic device, a set of recommendations to improve the rating for the individual and to lower the insurance premium.

8. A server, comprising:
   one or more processors; and
   a memory storing instructions that, when executed by the one or more processors, cause the one or more processors to:
     receive a first set of telematics data associated with a vehicle being operated at a location, the first set of telematics data indicating a velocity of the vehicle;
     access a second set of telematics data associated with each of a plurality of other vehicles being operated within a threshold distance of the location of the vehicle, the second set of telematics data indicating a velocity of each of the plurality of other vehicles within a time period associated with when the first set of telematics data was generated;

average the velocity of each of the plurality of other vehicles to determine an average velocity;
calculate an average velocity differential based upon a difference between the average velocity and the velocity of the vehicle; and
determine a rating based upon the average velocity differential.

9. The server of claim 8, wherein the instructions, when executed by the one or more processors, further cause the one or more processors to record a timestamp representing a time and date associated with when the first set of telematics data was generated, wherein the time period associated with when the first set of telematics data was generated is a threshold window of time with respect to the timestamp.

10. The server of claim 8, wherein the second set of telematics data includes at least one of: (i) a set of historical telematics data, and (ii) a set of real-time telematics data.

11. The server of claim 10, wherein:
the set of historical telematics data includes data indicative of weather conditions experienced by each of the plurality of other vehicles when the second set of telematics data was generated; and
the instructions, when executed by the one or more processors, that cause the one or more processors to determine the rating further cause the one or more processors to determine the rating by compensating for the weather conditions.

12. The server of claim 10, wherein:
the first set of telematics data includes global navigation satellite system (GNSS) data indicating a real-time geographic location of the vehicle and the set of real-time telematics data includes GNSS data indicating a real-time location of each of the plurality of other vehicles; and
the instructions, when executed by the one or more processors, further cause the one or more processors to determine whether each of the plurality of other vehicles are within the threshold distance of the location of the vehicle by comparing the real-time geographic location of the vehicle to the real-time location of each of the plurality of other vehicles.

13. The server of claim 8, wherein:
the second set of telematics data includes global navigation satellite system (GNSS) data indicating a geographic location of each of the plurality of other vehicles; and
the instructions, when executed by the one or more processors, further cause the one or more processors to average the velocity of each of the plurality of other vehicles further cause the one or more processors to average the velocity of each of the plurality of other vehicles by using the GNSS data.

14. The server of claim 8, wherein the instructions, when executed by the one or more processors, further cause the one or more processors to:
calculate an insurance premium based upon the rating;
transmit the insurance premium to an electronic device for presentation to an individual associated with the vehicle; and
provide a set of recommendations to improve the rating for the individual and to lower the insurance premium.

15. A tangible, non-transitory, computer-readable medium storing instructions that, when executed by one or more processors, cause the one or more processors to:
receive a first set of telematics data associated with a vehicle being operated at a location, the first set of telematics data indicating a velocity of the vehicle;
access a second set of telematics data associated with each of a plurality of other vehicles being operated within a threshold distance of the location of the vehicle, the second set of telematics data indicating a velocity of each of the plurality of other vehicles within a time period associated with when the first set of telematics data was generated;
average the velocity of each of the plurality of other vehicles to determine an average velocity;
calculate an average velocity differential based upon a difference between the average velocity and the velocity of the vehicle; and
determine a rating based upon the average velocity differential.

16. The tangible, non-transitory, computer-readable medium of claim 15, further including instructions that, when executed by the one or more processors, cause the one or more processors to record a timestamp representing a time and date associated with when the first set of telematics data was generated, wherein the time period being associated with when the first set of telematics data was generated is a threshold window of time with respect to the timestamp.

17. The tangible, non-transitory, computer-readable medium of claim 15, wherein:
the second set of telematics data includes at least one of: (i) a set of historical telematics data, and (ii) a set of real-time telematics data;
the first set of telematics data includes global navigation satellite system (GNSS) data indicating a real-time geographic location of the vehicle and the set of real-time telematics data includes GNSS data indicating a real-time location of each of the plurality of other vehicles; and
the instructions that, when executed by the one or more processors, further cause the one or more processors to determine whether each of the plurality of other vehicles are within the threshold distance of the location of the vehicle by comparing the real-time geographic location of the vehicle to the real-time location of each of the plurality of other vehicles.

18. The tangible, non-transitory, computer-readable medium of claim 17, wherein:
the set of historical telematics data includes data indicative of weather conditions experienced by each of the plurality of other vehicles when the second set of telematics data was generated; and
the instructions to determine the rating include instructions that, when executed by the one or more processors, further cause the one or more processors to determine the rating by compensating for the weather conditions.

19. The tangible, non-transitory, computer-readable medium of claim 15, wherein:
the second set of telematics data includes global navigation satellite system (GNSS) data indicating a geographic location of each of the plurality of other vehicles; and
the instructions to average the velocity of each of the plurality of other vehicles include instructions that, when executed by the one or more processors, further cause the one or more processors to average the velocity of each of the plurality of other vehicles by using the GNSS data.

20. The tangible, non-transitory, computer-readable medium of claim 15, further including instructions that, when executed by the one or more processors, cause the one or more processors to:
  calculate an insurance premium based upon the rating;
  transmit the insurance premium to an electronic device for presentation to an individual associated with the vehicle; and
  provide a set of recommendations to improve the rating for the individual and to lower the insurance premium.

* * * * *